(12) United States Patent
Choi et al.

(10) Patent No.: US 11,601,539 B2
(45) Date of Patent: Mar. 7, 2023

(54) ELECTRONIC DEVICE HAVING MICROPHONE

(71) Applicant: Samsung Electronics Co., Ltd., Gyeonggi-do (KR)

(72) Inventors: Nakhyun Choi, Gyeonggi-do (KR); Hojong Kim, Gyeonggi-do (KR); Hanbom Park, Gyeonggi-do (KR); Sungkeun Koo, Gyeonggi-do (KR); Jaeyoung Huh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 17/092,716

(22) Filed: Nov. 9, 2020

(65) Prior Publication Data

US 2021/0144242 A1    May 13, 2021

(30) Foreign Application Priority Data

Nov. 12, 2019  (KR) .................. 10-2019-0144541

(51) Int. Cl.
| | |
|---|---|
| *H04M 1/03* | (2006.01) |
| *G06F 1/16* | (2006.01) |
| *H04R 1/08* | (2006.01) |
| *H04R 1/04* | (2006.01) |

(52) U.S. Cl.
CPC ............ *H04M 1/03* (2013.01); *G06F 1/1684* (2013.01); *H04R 1/04* (2013.01); *H04R 1/08* (2013.01); *H04R 2499/11* (2013.01)

(58) Field of Classification Search
CPC .......... H04M 1/03; G06F 1/1684; H04R 1/04; H04R 1/08; H04R 2499/11
See application file for complete search history.

(56) References Cited

U.S. PATENT DOCUMENTS

| | | | |
|---|---|---|---|
| 2016/0241953 A1* | 8/2016 | Elian ................ | H04R 1/406 |
| 2016/0255182 A1* | 9/2016 | Lee ................... | H04M 1/026 |
| | | | 455/575.1 |
| 2019/0324496 A1* | 10/2019 | Cherukkate ....... | H05K 1/111 |
| 2020/0310489 A1* | 10/2020 | Spraggs ............ | H04N 5/2257 |

FOREIGN PATENT DOCUMENTS

KR    20-0398521    10/2005

* cited by examiner

*Primary Examiner* — Ankur Jain
*Assistant Examiner* — Angelica Perez
(74) *Attorney, Agent, or Firm* — Cha & Reiter, LLC

(57) ABSTRACT

In accordance with one aspect of the disclosure, an electronic device comprises a plate at least partially forming one surface of a housing and including a first through-hole; a printed circuit board disposed in the housing under the plate, the printed circuit having a second through-hole at least partly overlapping the first through-hole when viewed from above the first surface; a microphone disposed on a surface of the printed circuit board facing away from the plate, and at least partly overlapping the second through-hole when viewed from above the first surface; a seal member that is disposed between the plate and the printed circuit board around the first through-hole or the second through-hole; a support member that includes a first portion that faces the printed circuit board and includes an opening, the opening penetrated by the microphone, and a second portion that extends from the first portion and faces the plate; a first fixture the printed circuit board and the first portion; and a second fixture that is disposed between the plate and the second portion.

17 Claims, 10 Drawing Sheets

ELECTRONIC DEVICE HAVING MICROPHONE

CROSS-REFERENCE TO RELATED APPLICATION(S)

This application is based on and claims priority under 35 U.S.C. 119 to Korean Patent Application No. 10-2019-0144541, filed on Nov. 12, 2019, in the Korean Intellectual Property Office, the disclosure of which is herein incorporated by reference in its entirety.

BACKGROUND

1) Field

An embodiment of the disclosure relates to an electronic device having a microphone.

2) Description of Related Art

Digital technology provides a variety of electronic devices, such as a smart phones, tablet personal computers (PC), and personal digital assistants (PDAs), to name a few. The electronic devices are also include devices that are wearable on the user, such as smartwatches, to improve portability and accessibility of the device. Electronic device may include a microphone. The microphone can be used during a phone call or audio/video recording.

The above information is presented as background information only to assist with an understanding of the disclosure. No determination has been made, and no assertion is made, as to whether any of the above might be applicable as prior art with regard to the disclosure.

SUMMARY

In accordance with one aspect of the disclosure, an electronic device comprises a plate at least partially forming one surface of a housing and including a first through-hole; a printed circuit board disposed in the housing under the plate, the printed circuit having a second through-hole at least partly overlapping the first through-hole when viewed from above the first surface; a microphone disposed on a surface of the printed circuit board facing away from the plate, and at least partly overlapping the second through-hole when viewed from above the first surface; a seal member that is disposed between the plate and the printed circuit board around the first through-hole or the second through-hole; a support member that includes a first portion that faces the printed circuit board and includes an opening, the opening penetrated by the microphone, and a second portion that extends from the first portion and faces the plate; a first fixture the printed circuit board and the first portion; and a second fixture that is disposed between the plate and the second portion.

In accordance with another aspect of the disclosure, an electronic device comprises a housing that includes a first plate, a second plate disposed on a side opposite to the first plate including an opening, and a lateral member at least partially surrounding a space between the first plate and the second plate; a display disposed in the space, wherein at least a part of the display is visible through the first plate; a third plate exposed through the opening and including a first through-hole; a printed circuit board disposed in the space and including a second through-hole at least partly overlapping the first through-hole when viewed from above the third plate; a microphone on a surface facing away from the third plate, wherein the microphone at least partly overlaps the second through-hole when viewed from above the third plate; a seal member that is disposed between the third plate and the printed circuit board around the first through-hole or the second through-hole; a support member including a first portion, which faces the surface and includes an opening penetrated by the microphone, and a second portion that extends from the first portion and faces the third plate; a first fixture that is disposed between the surface and the first portion; and a second fixture that is disposed between the third plate and the second portion.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Slimmer electronic devices can be convenient for users because they are more portable. However, making an electronic device slimmer also reduces the area for placement of various structures and components. Various structures and/or components disposed in a limited space makes it harder to achieve good microphone performance.

Accordingly, certain embodiments provide a placement of a microphone in a limited area while achieving good performance. In an embodiment of the disclosure, a microphone can be easily placed in the electronic device, and performance of the microphone can be secured by simplifying a passage along which external sounds move to the microphone, thereby reducing a loss of the sounds, and avoiding deterioration of acoustic characteristics.

Figure 1:
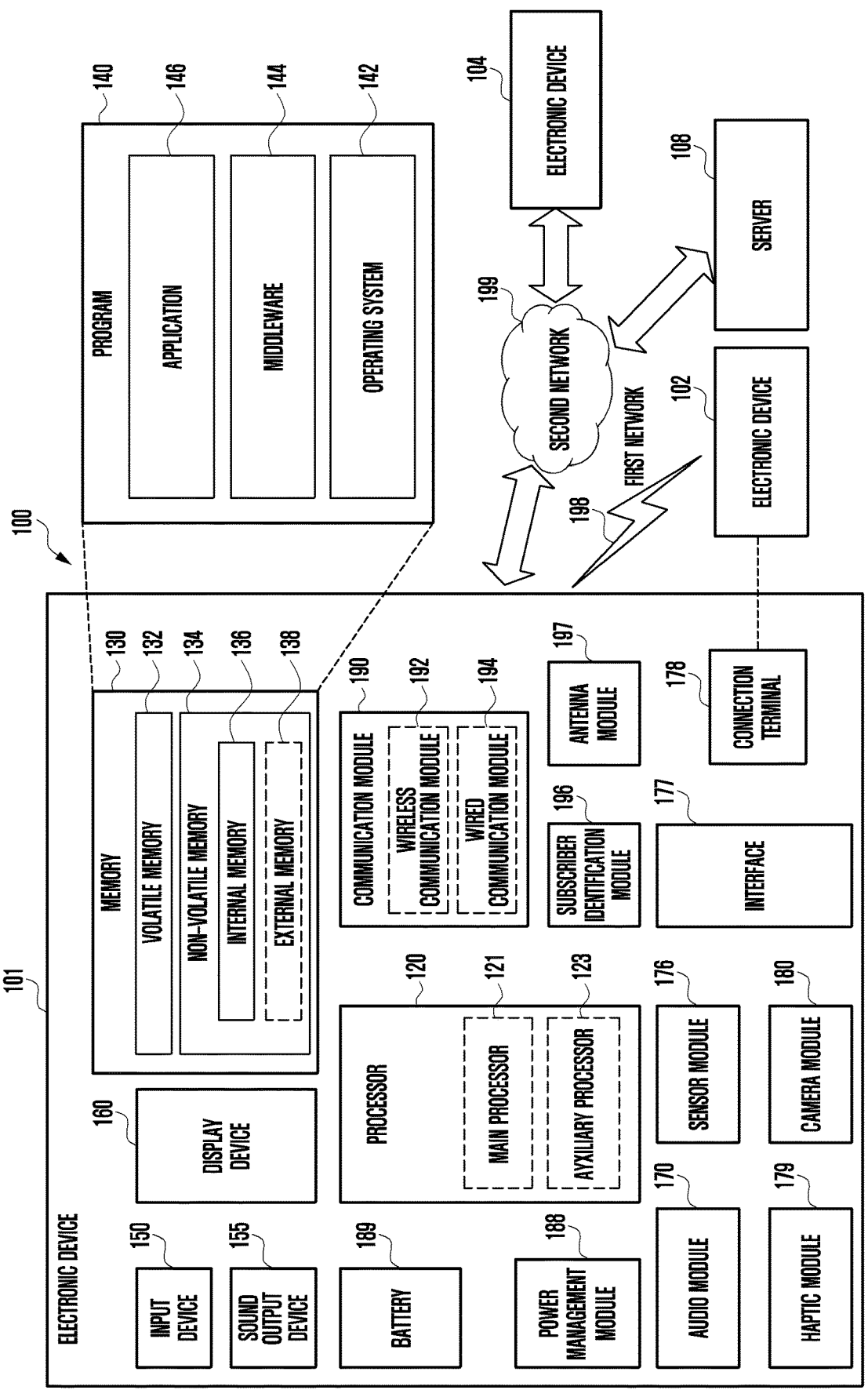
FIG. 1 is a block diagram of an electronic device in a network environment according to certain embodiments of the disclosure.
Figure 2A:
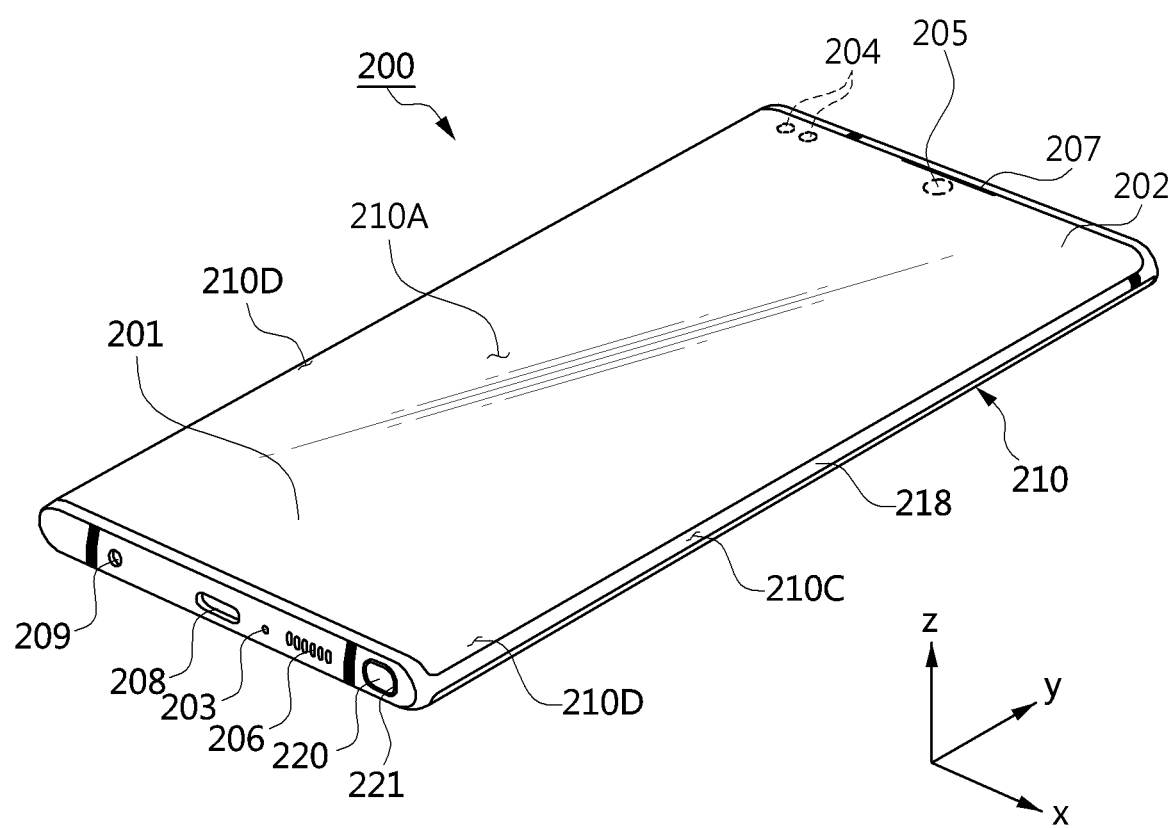
FIG. 2A is a perspective view illustrating a front surface of a mobile electronic device according to an embodiment of the disclosure.
Figure 2B:
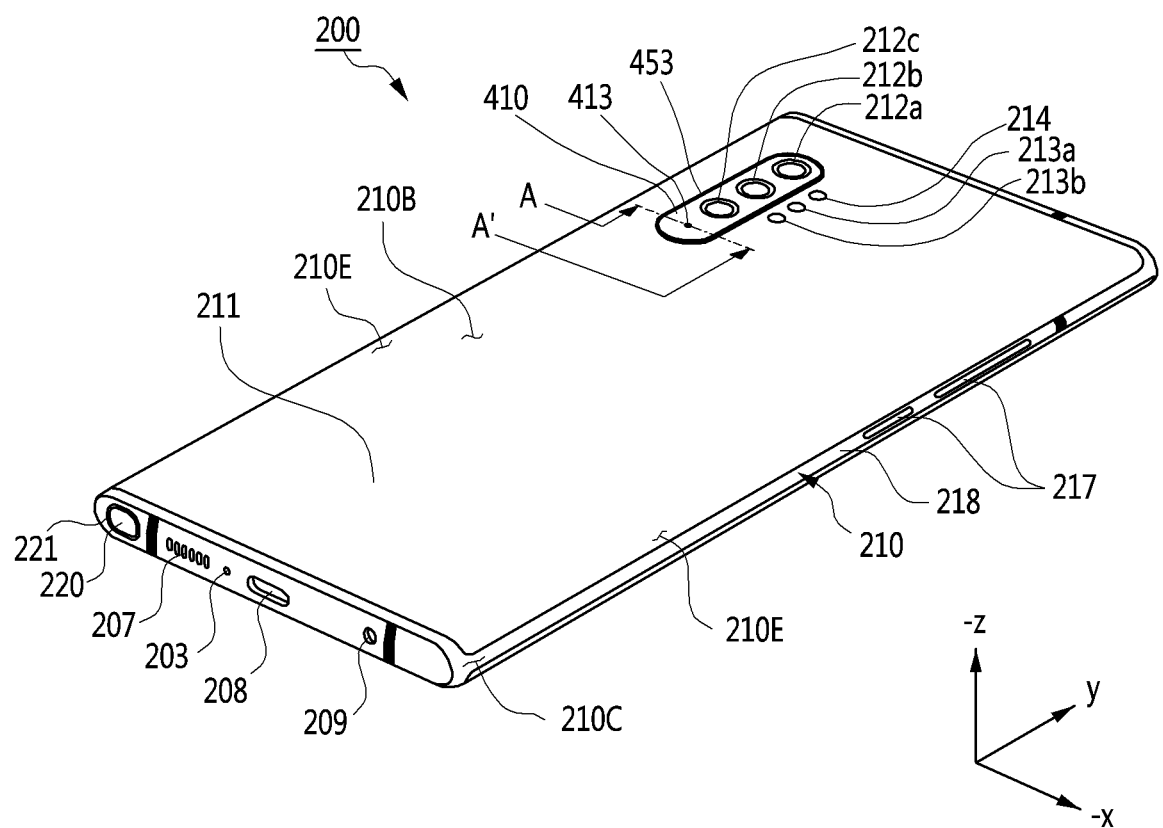
FIG. 2B is a perspective view illustrating a rear surface of the electronic device of FIG. 2A according to an embodiment of the disclosure.

FIG. 1 describes the functional components of an electronic device, while FIGS. 2A and 2B describe the exterior housing.

Electronic Device

The following description with reference to the accompanying drawings is provided to assist in a comprehensive understanding of certain embodiments of the disclosure as defined by the claims and their equivalents. It includes various specific details to assist in that understanding but these are to be regarded as merely exemplary. Accordingly, those of ordinary skill in the art will recognize that various changes and modifications of the certain embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of certain embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 illustrates an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (MI) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Housing

FIG. 2A is a perspective view illustrating a front surface of a mobile electronic device 200 according to an embodiment of the disclosure.

FIG. 2B is a perspective view illustrating a rear surface of the electronic device 200 of FIG. 2A according to an embodiment of the disclosure.

Referring to FIGS. 2A and 2B, according to an embodiment, an electronic device 200 may include a housing 210 that includes a front surface 210A, a rear surface 210B, and a lateral surface 210C that surrounds a space between the front surface 210A and the rear surface 210B. According to another embodiment, the housing 210 may refer to a structure that forms a part of the front surface 210A, the rear surface 210B, and the lateral surface 210C. According to an embodiment, the front surface 210A may be formed of a front plate (or first plate) 202 (e.g., a glass plate or polymer plate coated with a variety of coating layers) at least a part of which is substantially transparent. The rear surface 210B may be formed of a rear plate (or second plate) 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. In some embodiments, the rear plate 211 and the lateral bezel structure 218 may be integrally formed and may be of the same material (e.g., a metallic material such as aluminum).

In the shown embodiment, the front plate 202 may include two first regions 210D disposed at long edges thereof, respectively, and bent and extended seamlessly from the front surface 210A toward the rear plate 211. In the shown embodiment, the rear plate 211 may include two second regions 210E disposed at long edges thereof, respectively, and bent and extended seamlessly from the rear surface 210B toward the front plate 202 (refer to FIG. 2B). In certain embodiments, the front plate 202 (or the rear plate 211) may include only one of the first regions 210D (or of the second regions 210E). In certain embodiments, the first regions 210D or the second regions 210E may be omitted in part. In the embodiments, when viewed from a lateral side of the electronic device 200, the lateral bezel structure 218 may have a first thickness (or width) on a lateral side where one of the first regions 210D or one of the second regions 210E is not included, and may have a second thickness, being less than the first thickness, on another lateral side where one of the first regions 210D or one of the second regions 210E is included.

According to an embodiment, the electronic device 200 may include at least one of a display 201, audio modules 203, 206, 207 and 413, sensor modules 204 and 219, camera modules 205, 212*a*, 212*b*, 212*c*, 213*a*, 213*b*, and 214, key input devices 217, a pen input device 220, and connector holes 208 and 209. In certain embodiments, the electronic device 200 may omit at least one (e.g., the key input devices 217) of the above components, or may further include other components (e.g., a fingerprint sensor, a heart rate monitor (HRM) sensor, or a light emitting device). In certain embodiments, the electronic device 200 may include the electronic device 101 of FIG. 1.

The display 201 may be exposed through a substantial portion of the front plate 202, for example. In certain embodiments, at least a part of the display 201 may be exposed through the front plate 202 that forms the front surface 210A and the first regions 210D. In certain embodiments, outlines (i.e., edges and corners) of the display 201 may have substantially the same form as those of the front plate 202. In another embodiment (not shown), the spacing between the outline of the display 201 and the outline of the front plate 202 may be substantially unchanged in order to enlarge the exposed area of the display 201.

In another embodiment (not shown), a recess or opening may be formed in a portion of a display area of the display 201 to accommodate or to be aligned with at least one of the audio modules (e.g., the audio module 207), the sensor module 204, and the camera module 205. In another embodiment (not shown), at least one of the audio modules (e.g., the audio module 207), the sensor module 204, and the camera module 205 may be disposed on the back of the display area of the display 201. In another embodiment (not shown), the display 201 may be combined with, or adjacent to, a touch sensing circuit, a pressure sensor capable of measuring the touch strength (pressure), and/or a digitizer for detecting a stylus pen. In certain embodiments, at least a part of the sensor modules 204 and/or at least a part of the key input devices 217 may be disposed in one of the first regions 210D and/or one of the second regions 210E.

The audio modules 203, 206, 207 and 413 may correspond to a microphone holes (e.g., the audio modules 203 and 413) and speaker holes (e.g., the audio modules 206 and 207). The microphone holes may contain a microphone disposed therein for acquiring external sounds and, in a case, contain a plurality of microphones to sense a sound direction. According to an embodiment, a microphone hole (e.g., the audio module 203) may be formed on the lateral surface 210C of the housing 210. Another microphone hole (e.g., the audio module 413) may be formed on the rear surface 210B of the housing 210. The speaker holes may be classified into an external speaker hole (e.g., the audio module 206) and a call receiver hole (e.g., the audio module 207). In certain embodiments, the microphone hole (e.g., the audio module 203) and the speaker holes (e.g., the audio modules 206 and 207) may be implemented as a single hole, or a speaker (e.g., a piezo speaker) may be provided without the speaker holes.

The sensor module 204 may generate electrical signals or data corresponding to an internal operating state of the electronic device 200 or to an external environmental condition. The sensor module 204 may be disposed inside the housing 210 to be positioned near the front surface 210A. The sensor module 204 may include, for example, a proximity sensor. In certain embodiments (not shown), the electronic device 200 may include various sensor modules disposed on various different positions. The electronic device 200 may include, for example, a fingerprint sensor, or a heart rate monitor (HMR) sensor. The fingerprint sensor may be disposed inside the housing 210 to be positioned underneath or near the front surface 210A or the display 201. In another embodiment, the fingerprint sensor may be disposed inside the housing 210 to be positioned underneath or near the rear surface 210B. The HRM sensor may be disposed inside the housing 210 to be positioned underneath or near the rear surface 210B. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor (e.g., the sensor module 204).

The camera modules 205, 212*a*, 212*b*, 212*c*, 213*a*, 213*b* and 214 may include a first camera device (e.g., the camera module 205), second camera devices (e.g., the camera modules 212*a*, 212*b* and 212*c*), a third camera devices (e.g., the camera modules 213*a* and 213*b*), and/or a flash (e.g., the camera module 214). The first camera device may be disposed inside the housing 210 to be positioned underneath or near the front surface 210A, for example. The second camera devices may be positioned in an opening (not shown) formed on the rear plate 211. The third camera devices and/or the flash may be disposed inside the housing 210 to be positioned underneath or near the rear surface (210B). The first camera device, the second cameras, or the third devices may include one or more lenses, an image sensor, and/or an image signal processor. The flash may include, for example, a light emitting diode or a xenon lamp. In certain embodiments, two or more lenses (infrared cameras, wide angle and telephoto lenses) and image sensors may be disposed on one side of the electronic device 200.

The key input devices 217 may be disposed on the lateral surface 210C of the housing 210. In another embodiment, the electronic device 200 may not include some or all of the key input devices 217 described above, and the key input devices 217 which are not included may be implemented in another form such as a soft key on the display 201. In another embodiment, the key input devices 217 may include a sensor module (not shown) disposed inside the housing 210 to be positioned underneath or near the rear surface 210B, for example. In another embodiment, the key input devices 217 may include a sensor module (not shown) positioned in an opening (not shown) formed on the rear plate 211, for example.

The light emitting device (not shown) may be disposed inside the housing 210 to be positioned underneath or near the front surface 210A, for example. In another embodiment, the light emitting device may be disposed in an opening formed on the front plate 202, for example. For example, the light emitting device may provide status information of the electronic device 200 in an optical form. In certain embodiments, the light emitting device may provide a light source associated with the operation of the camera module 205. The light emitting device may include, for example, a light emitting diode (LED), an infrared (IR) LED, or a xenon lamp.

The connector holes 208 and 209 may include a first connector hole (e.g., the connector hole 208) adapted for a connector (e.g., a universal serial bus (USB) connector) for transmitting and receiving power and/or data to and from an external electronic device, and/or a second connector hole (e.g., the connector hole 209) adapted for a connector (e.g., an earphone jack) for transmitting and receiving an audio signal to and from an external electronic device. In another embodiment, the second connector hole (e.g., the connector hole 209) may be omitted in case that the first connector hole (e.g., the connector hole 208) and the related connector may be used for transmitting and receiving an audio signal from the external electronic device.

The pen input device 220 (e.g., a stylus pen) may be inserted into or removed from the housing 210 through a hole 221 formed in the housing 210, and may include a button for assisting an easy removal. The pen input device 220 may have a built-in resonant circuit to interwork with an electromagnetic induction panel (e.g., the electromagnetic induction panel 390 in FIG. 3) included in the electronic device 200. According to an embodiment, the pen input device 220 may be implemented in a manner of an electromagnetic induction.

According to certain embodiments, the pen input device 220 may also be implemented in a manner of an electromagnetic resonance (EMR), active electrical stylus (AES), or electric coupled resonance (ECR).

As can been in FIGS. 2A and 2B, in certain embodiments, the electronic device 200 is generally planar with a front surface 210A and a rear surface 210B. By convention, the front surface 210A can be the surface that the display 210 is visible to the user. Providing an electronic device 200 that is thinner/slimmer, or has a lateral surface 210C that has minimal height increases the portability of the electronic device 200 and convenience to the user. However, the foregoing reduces the area where certain components, such as a microphone can be placed.

Figure 3:
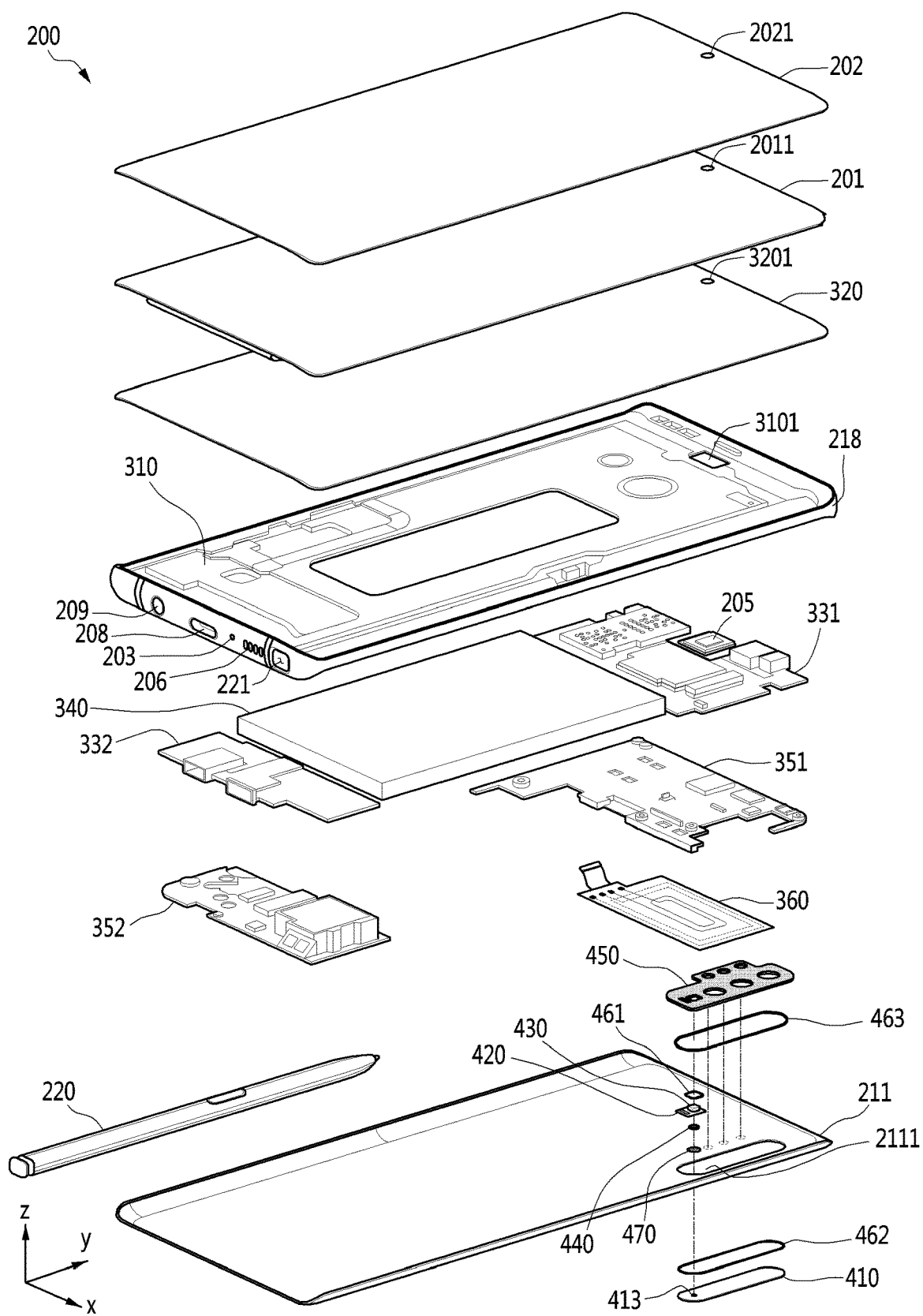
FIG. 3 is an exploded perspective view illustrating the electronic device of FIG. 2A according to an embodiment of the disclosure.

FIG. 3 is an exploded perspective view illustrating the electronic device of FIG. 2A according to an embodiment of the disclosure. The electronic device 200 includes a microphone 430 which is capable of converting sound proximate to the electronic device to an electrical signal. In certain embodiments, the microphone 430 can be exposed through an opening 2111 in the rear plate 211. Referring to FIG. 3, an electronic device 200 according to an embodiment may include a lateral bezel structure 218, a first support member 310 (e.g., a bracket), the front plate 202, a display 201, an electromagnetic induction panel 320, a first board assembly 331, a second board assembly 332, a battery 340, a second support member 351, a third support member 352, an antenna structure 360, a pen input device 220, or a rear plate 211. In certain embodiments, the electronic device 200 may omit at least one (e.g., the first support member 310, the second support member 351, or the third support member 352) of the constituent elements, or may other constituent elements.

According to an embodiment, the electromagnetic induction panel 320 (e.g., a digitizer) may be a panel for detecting an input of the pen input device 220. For example, the electromagnetic induction panel 320 may include a printed circuit board (PCB) (e.g., a flexible printed circuit board (FPCB)) and a shield sheet. The shield sheet may prevent interference among the components (e.g., the display module, the printed circuit board, the electromagnetic induction panel, etc.) included in the electronic device 200) due to electromagnetic fields produced from the components. The shield sheet obstructs the electromagnetic fields produced from the components, and thereby enables the input from the pen input device 220 to be accurately transmitted to a coil included in the electromagnetic induction panel 320. The electromagnetic induction panel 320 according to certain embodiments may include an opening 3201 that is formed in at least a partial region corresponding to the optical sensor (e.g., the first camera module 205 or the biometric sensor) disposed inside the electronic device 200.

The first support member 310 may be disposed, for instance, inside the electronic device 200, and be connected to the lateral bezel structure 218 or be formed integrally with the lateral bezel structure 218. The first support member 310 may be formed of, for example, a metallic material and/or a nonmetallic material (e.g., a polymer material). According to an embodiment, the first support member 310 may include an opening 3101 that is located in correspondence to the optical sensor (e.g., the first camera module 205).

The display 201 may be coupled to, for instance, one surface of the first support member 310, and be disposed between the first support member 310 and the front plate 202. The first board assembly 331 and the second board assembly 332 may be coupled to, for instance, the other surface of the first support member 310, and be disposed between the first support member 310 and the rear plate 211.

According to an embodiment, the first board assembly 331 may include a first printed circuit board (PCB) (not illustrated). The display 201 or the first camera module 205 may be electrically connected to the first printed circuit board through various electrical paths such as a flexible printed circuit board (FPCB). The first board assembly 331 may include various electronic parts that are electrically connected to the first printed circuit board. The electronic parts may be disposed on the first printed circuit board, and be electrically connected to the first printed circuit board through an electrical path such as a cable or an FPCB. The electronic parts may include, for instance, at least some of the constituent elements included in the electronic device 101 of FIG. 1.

According to certain embodiments, when viewed from above the rear plate 211, the first board assembly 331 may include a main PCB, a slave PCB that is disposed to partly overlap the main PCB, and/or an interposer substrate between the main PCB and the slave PCB.

According to an embodiment, when viewed from above the front plate 202, the second board assembly 332 may be disposed apart from the first board assembly 331 across the battery 340. The second board assembly 332 may include a second printed circuit board that is electrically connected to the first printed circuit board of the first board assembly 331. The second board assembly 332 may include various electronic parts that are electrically connected to the second printed circuit board. The electronic parts may be disposed on the second printed circuit board, and be electrically connected to the second printed circuit board through an electrical path such as a cable or an FPCB. The electronic parts may include, for instance, at least some of the constituent elements included in the electronic device 101 of FIG. 1. According to an embodiment, the electronic parts may be a USB connector that utilizes the first connector hole 208, an earphone jack that utilizes the second connector hole 209, a microphone that utilizes the microphone hole 203, or a speaker that utilizes the speaker hole 206.

According to an embodiment, the battery 340 may be disposed between the first support member 310 and the rear plate 211, and be coupled with the first support member 310. The battery 340 may be a device for supplying power to at least one constituent element of the electronic device 200, for example, a primary cell which is not rechargeable, a secondary cell which is rechargeable, or a fuel cell. At least a part of the battery 340 may be disposed, for instance, on substantially the same plane as the first printed circuit board of the first board assembly 331 or the second printed circuit board of the second board assembly 332. The battery 340 may be integrally disposed inside the electronic device 200, or be disposed to be attachable/detachable to/from the electronic device 200.

According to an embodiment, the second support member 351 may be disposed between the first support member 310 and the rear plate 211, and be coupled with the first support member 310 through fastening elements such as bolts. At least a part of the first board assembly 331 may be disposed between the first support member 310 and the second support member 351, and the second support member 351 may cover and protect the first board assembly 331.

According to an embodiment, when viewed from above the front plate 202, the third support member 352 may be disposed apart from the second support member 351 across the battery 340. The third support member 352 may be disposed between the first support member 310 and the rear plate 211, and be coupled with the first support member 310 through fastening elements such as bolts. At least a part of the second board assembly 332 may be disposed between the first support member 310 and the third support member 352, and the third support member 352 may cover and protect the second board assembly 332.

According to an embodiment, the second support member 351 and/or the third support member 352 may be formed of a metallic material and/or a nonmetallic material (e.g., a polymer material). According to certain embodiments, the second support member 351 and/or the third support member 352 may be referred to as a rear case(s).

According to an embodiment, the antenna structure 360 may be disposed between the second support member 351 and the rear plate 211. The antenna structure 360 may be implemented, for instance, in a film type such as an FPCB. According to an embodiment, the antenna structure 360 may include at least one conductive pattern that is utilized as a loop type antenna radiator. For example, the at least one conductive pattern may include a plane-like spiral conductive pattern (e.g., a flat coil or a pattern coil). According to certain embodiments (not illustrated), at least a part of the antenna structure 360 may be disposed between the rear plate 211 and the battery 340. The antenna structure 360 may include, for instance, an antenna radiator for near field communication (NEC), an antenna radiator for wireless communication, and/or an antenna radiator for magnetic secure transmission (MST). The antenna structure 360 may perform, for instance, NFC with an external device, or transmit/receive power required for charging by wireless. In another embodiment, the antenna structure may be formed by some of the lateral bezel structure 218 and/or the first support member 310 or a combination thereof.

According to an embodiment, the display 201 may include an opening 2011 that is formed in at least a partial region corresponding to the optical sensor (e.g., the first camera module 205 or the biometric sensor) disposed inside the electronic device 200. The opening 2011 may be formed, for instance, in a through-hole shape. According to any embodiment, the opening 2011 may be implemented in a notch shape. The optical sensor may receive external light through a partial region 2021 of the front plate 202, and the opening 2011 of the display 201 and the opening 3201 of the electromagnetic induction panel 320, both of which are aligned with the partial region 2021. According to certain embodiments (not illustrated), a substantially transparent region formed by changing a pixel structure and/or an interconnection structure may be implemented in place of the opening 2011 of the display 201.

According to an embodiment, the electronic device 200 may include a microphone hole 413 (see FIG. 2B or 3) that is formed in the rear surface 210B (see FIG. 2B) and a microphone 430 that is disposed inside the electronic device 200 in correspondence to the microphone hole 413. External sounds may be introduced into the microphone 430 through the microphone hole 413 of the rear surface 210B, and the microphone 430 may produce electrical signals associated with the external sounds. The microphone 430 may be utilized by various applications such as a call or video recording. According to certain embodiments, the microphone 430 may be utilized for noise-cancelling. For example, the electronic device 200 may detect a wavelength of a noise through the microphone 430, and reduce the noise using a reversed-phase sound wave of the detected noise. According to certain embodiments, the microphone 430 may be utilized for a function (e.g., a zoom-in microphone function) to, if zooming-in is performed during video recording, increase and record a sound of a subject in proportion to the zooming-in and lower ambient sounds. The microphone 430 may be utilized for various functions other than the function.

Figure 4:
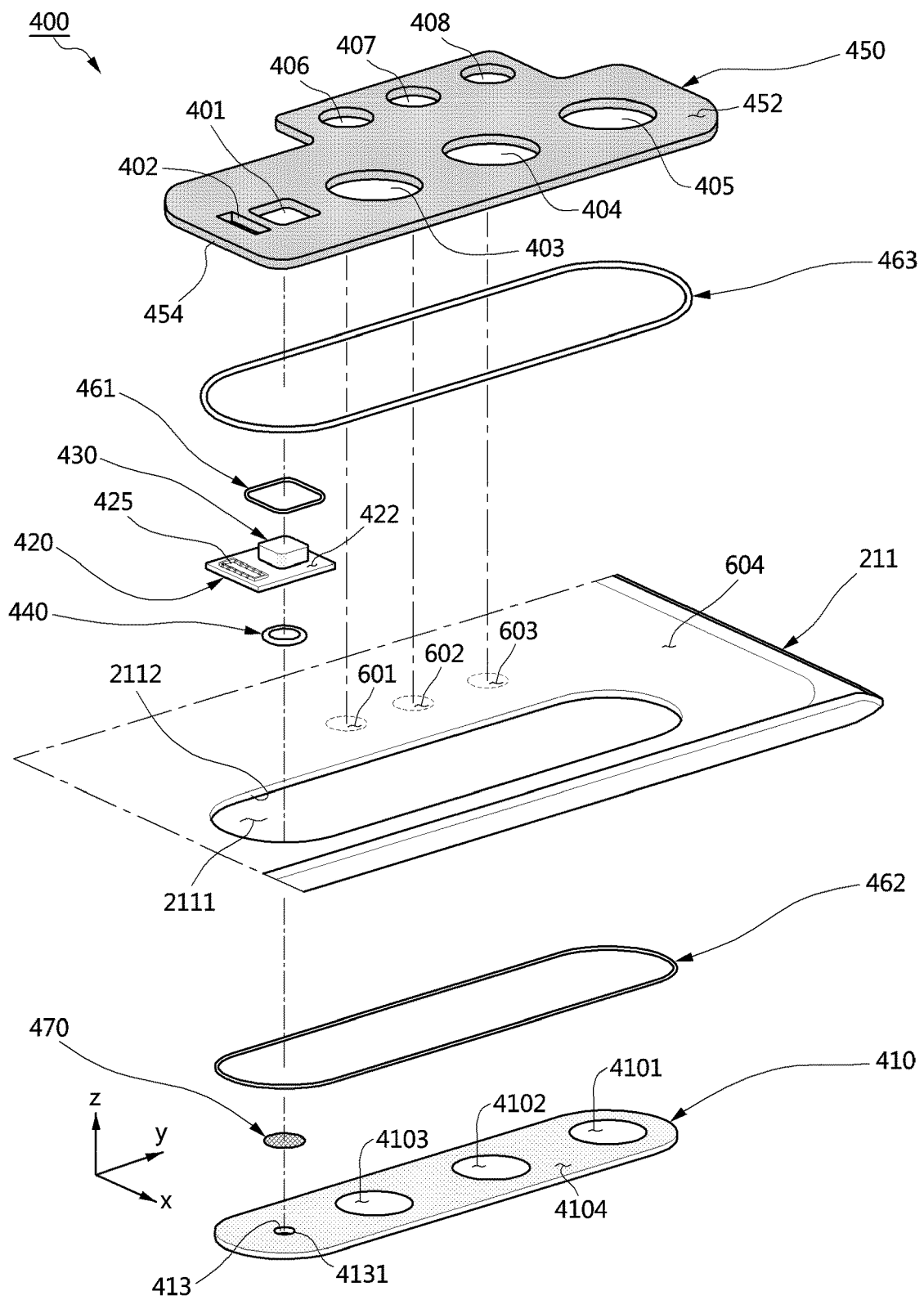
FIG. 4 is an enlarged view illustrating an assembly including a microphone in the exploded perspective view of FIG. 3 according to an embodiment of the disclosure.
Figure 5:
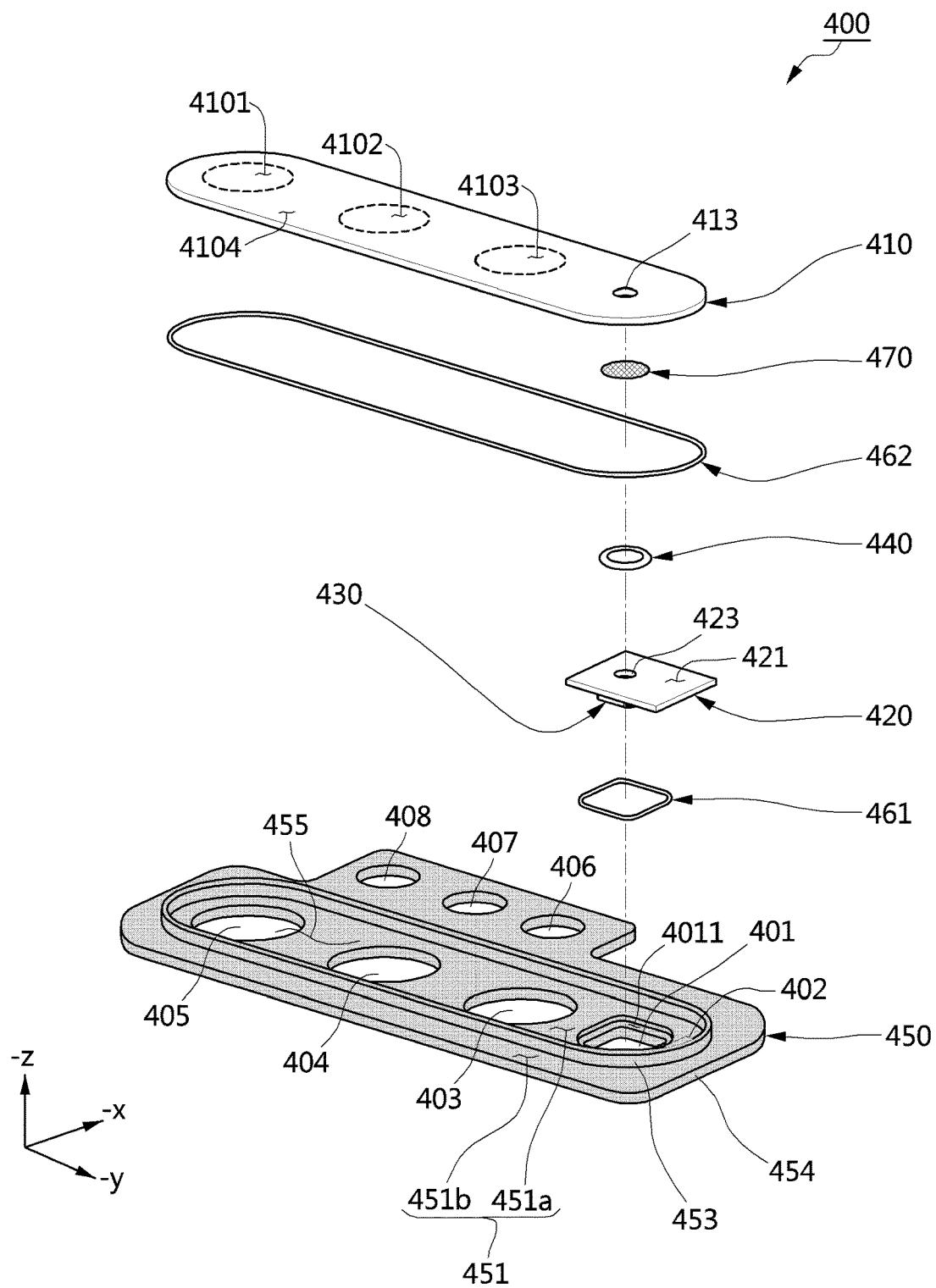
FIG. 5 is an exploded perspective view illustrating the assembly including the microphone according to an embodiment of the disclosure in another direction.

FIG. 4 is an enlarged view illustrating an assembly 400 including the microphone 430 in the exploded perspective view according to an embodiment of the disclosure. FIG. 5 is an exploded perspective view illustrating the assembly 400 including the microphone 430 according to an embodiment of the disclosure in another direction.

The microphone 425 can be configured to receive and convert sound proximate to an opening 2111 in the rear plate 211. A fourth support member 450 can include holes 401-408. The microphone 425 can be disposed on a PCB 420, and hole 410 can accommodate microphone 425. The opposite side of the PCB 420 can be coupled to a third plate 410 by a seal member 440 and adhesive member 470 to the third plate 410. The third plate 410 includes a through hole 413 corresponding to the position of the microphone 425. A sound permeable member 470 can at least partially overlap the first through hole 413. The PCB 420 can also include a through hole. In certain embodiments, through hole 413, the through hole in the PCB 420 and the sound permeable member 470 can align to form an passage for audio signals to be incident on the microphone 430.

Referring to FIGS. 3, 4, and 5, in an embodiment, the assembly 400 may include a third plate 410, a third printed circuit board 420, a microphone 430, a seal member 440, a sound permeable member 470, a fourth support member 450, a first adhesive member 461, or a second adhesive member 462. According to an embodiment, the assembly 400 may facilitate disposition of the microphone 430. The assembly 400 may simplify a passage along which external sounds move to the microphone 430, reduce a loss of the sounds or deterioration of acoustic characteristics, and secure performance of the microphone 430.

According to an embodiment, at least a part of the fourth support member 450 may be disposed inside the housing 210 (see FIG. 2A or 2B), and the fourth support member 450 may be coupled with the rear plate 211 through the third adhesive member 463. The rear plate 211 may include an opening 2111. The third plate 410 may be coupled with the fourth support member 450 through the second adhesive member 462. The third plate 410 may be exposed to the outside through the opening 2111 of the rear plate 211, and may form a part of the rear surface 210B (see FIG. 2B).

The fourth support member 450 may include a plate 454 that has a third surface 451 that faces the rear plate 211 and a fourth surface 452 that is directed in a direction opposite to the third surface 451. The fourth support member 450 may include a ridge (or a sidewall) 453 that protrudes from the third surface 451 of the plate 454 to the opening 2111 of the rear plate 211. The protruded ridge 453 may extend along an edge 2112 of the opening 2111 formed in the rear plate 211, and be formed, for instance, in a loop shape. The third surface 451 may include a first region 451a that is surrounded by the protruded ridge 453, and a second region 451b that at least partly surrounds the first region 451a across the protruded ridge 453. Due to the protruded ridge 453 and the first region 451a of the third surface 451, a recessed space 455 may be formed in the fourth support member 450. The third plate 410 may be disposed in the space 455 in the face of the first region 451a of the third surface 451. The second adhesive member 462 may be disposed between the third plate 410 and the first region 451a of the third surface 451. The second adhesive member 462 may extend along the protruded ridge 453, and be formed, for instance, in a loop shape. The second adhesive member 462 may serve as a seal member that not only couples the third plate 410 and the fourth support member 450 but also prevents foreign materials such as water and dust from entering between the third plate 410 and the fourth support member 450.

According to an embodiment, the protruded ridge 453 of the fourth support member 450 may extend between the rear plate 211 and the third plate 410, and form a part of the rear surface 210B (see FIG. 2B). In certain embodiments, referring to FIG. 2B, the protruded ridge 453 and the third plate 410 disposed inside the protruded ridge 453 may protrude with respect to the rear plate 211 in a–z axis direction. According to certain embodiments, the protruded ridge 453 and the third plate 410 may be implemented so as not to protrude with respect to the rear plate 211 in the –z axis direction. For example, an outer surface formed by the protruded ridge 453 and the third plate 410 may be seamlessly connected so as not to protrude with respect to an outer surface formed by the rear plate 211.

Referring to FIGS. 4 and 5, in an embodiment, the third printed circuit board 420 may include a first surface 421 that faces the third plate 410, and a second surface 422 that face away from the third plate 410 or is directed in a direction substantially opposite to the first surface 421 and the third plate 410. The second surface 422 may face the first region 451a of the third surface 451 included in the fourth support member 450. The third printed circuit board 420 may include a second through-hole 423 that passes through the first surface 421 and the second surface 422. When viewed from above the third plate 410, the first through-hole 413 of the third plate 410 may at least partly overlap the second through-hole 423 of the third printed circuit board 420. The microphone 430 may be disposed on the second surface 422 of the third printed circuit board 420. When viewed from above the first surface 421, the second through-hole 423 may at least partly overlap the microphone 430.

The seal member 440 may be disposed between the third plate 410 and the third printed circuit board 420 around the first through-hole 413 of the third plate 410 and the second through-hole 423 of the third printed circuit board 420. The seal member 440 may provide a passage along which external soundwaves move from the first through-hole 413 to the second through-hole 423 via the sound permeable member 470. The seal member 440 may prevent sounds from laterally leaking between the third plate 410 and the third printed circuit board 420. The external sounds may substantially pass the passage of the seal member 440 between the first through-hole 413 and the second through-hole 423, and be introduced into the microphone 430 which converts the sounds to electrical signals. The seal member 440 may be implemented by various flexible members such as isoprene (commonly known as "rubber"), and be elastically disposed between the third plate 410 and the third printed circuit board 420.

According to an embodiment, the sound permeable member 470 may be disposed between the third plate 410 and the seal member 440. When viewed from above the rear surface 210B (see FIG. 2B) of the electronic device 200, the first through-hole 413 of the third plate 410 may overlap the sound permeable member 470. The external sounds may substantially pass the sound permeable member 470, and be introduced into the microphone 430. The sound permeable member 470 may include, for instance, various porous members.

According to an embodiment, the sound permeable member 470 may be formed of a material which sounds can pass but blocks or substantially impedes foreign materials such as water. Due to the sound permeable member 470, water can be prevented from introduction into the electronic device 200 through the first through-hole 413. The sound permeable member 470 may contribute to waterproofness against the microphone 430 along with the seal member 440. According to an embodiment, the sound permeable member 470 may be molded using stretched Polytetrafluoroethylene (PTFE), such as Gore-Tex, a registered trademark of W. L. Gore and Associates. The sound permeable member 470 may be implemented using various materials other than Expanded PTFE.

The third printed circuit board 420 may be disposed in the space 455 formed in the fourth support member 450. The second surface 452 of the third printed circuit board 420 may be disposed to face the third surface 451 (e.g., the first region 451a) of the fourth support member 450.

In consideration of a height at which the microphone 430 protrudes with respect to the second surface 451, the fourth support member 450 may include a first opening 401 formed at a position corresponding to the microphone 430. When the second surface 452 of the third printed circuit board 420 is disposed to face the third surface 451 of the fourth support member 450, the microphone 430 may be inserted into the first opening 401. According to certain embodiments (not illustrated), in place of the first opening 401, a recess into which the microphone 430 can be inserted may be formed in the fourth support member 450.

The first opening 401 of the fourth support member 450 may include a stepped lateral surface. For this reason, a recess 4011 into which the third printed circuit board 420 can be fitted may be formed in the third surface 451 of the fourth support member 450. A structure in which the microphone 430 is inserted into the first opening 401 of the fourth support member 450 and/or a structure in which the third printed circuit board 420 is disposed in the recess 4011 of the fourth support member 450 can contribute to making the assembly 400 slim. In certain embodiments, the recess 4011 may be omitted.

The first adhesive member 461 may be disposed between the third printed circuit board 420 and the fourth support member 450. For example, the first adhesive member 461 may be disposed between the third printed circuit board 420 (specifically the second surface 422) and one side (not illustrated) of the recess 4011 that faces the second surface 422. The first adhesive member 461 may extend along the first opening 401, and be formed, for instance, in a loop shape.

According to an embodiment, the third printed circuit board 420 may be electrically connected to the first printed circuit board included in the first board assembly 331 of FIG. 3. For example, a connector 425 may be disposed on the second surface 422 of the third printed circuit board 420, the surface that the microphone 430 is mounted to. The connector 425 disposed on the third printed circuit board 420 may be electrically connected to the connector that is disposed on the first printed circuit board of the first board assembly 331 through various electrical paths such as a flexible printed circuit board (not illustrated). An electrical signal produced from the microphone 430 may be transmitted to the first printed circuit board through the electrical path. According to an embodiment, the fourth support member 450 may include a second opening 402 which the electrical path passes. When viewed from above the third surface 451 of the fourth support member 450, the second opening 402 may be disposed adjacent to the first opening 401 inside the protruded ridge 453. According to certain embodiments (not illustrated), the first opening 401 and the second opening 402 may be formed into a single opening.

As another example, the connector 425 disposed on the third printed circuit board 420 may be directly connected to the connector disposed on the first printed circuit board of the first board assembly 331 as a board-to-board connector. The third printed circuit board 420 may be electrically connected to the first printed circuit board of the first board assembly 331 through an interposer.

According to certain embodiments (not illustrated), at least one second terminal (e.g., a copper foil pad) (not illustrated) that is electrically connected to the microphone 430 in place of the connector 425 may be disposed on the second surface 422 of the third printed circuit board 420. At least one first terminal facing the at least one second terminal may be disposed on the first board assembly 331 of FIG. 3 or the first printed circuit board included in the first board assembly 331. A flexible conductive member may be disposed between the first terminal and the second terminal through the second opening 402, and be elastically held in contact with the first terminal and the second terminal. The flexible conductive member may include, for instance, a C clip (e.g., a C-shaped spring), a pogo pin, a spring, a conductive Poron, a conductive rubber, a conductive tape, or a copper connector. The electrical signal produced from the microphone 430 may be transmitted to the first printed circuit board through the flexible conductive member.

According to certain embodiments, the third printed circuit board 420 may be electrically connected to the first printed circuit board included in the first board assembly 331 of FIG. 3 through various other methods or structures.

According to an embodiment, a structure in which the connector 425 disposed on the third printed circuit board 420 is electrically connected to the first printed circuit board of the first board assembly 331 through the flexible printed circuit board may be made to maintain the electrical connection between the connector 425 and the flexible printed circuit board in response to an external shock or an external pressure caused by falling or an external force, or prevent damage to the assembly 400 including the microphone 430.

Because the constituent elements of the electronic device 200 have different masses (or centers of mass) or weights from one another, an external shock can cause structures to sway or deviate from each other. According to an embodiment, a structure in which the connector 425 disposed on the third printed circuit board 420 is electrically connected to the first printed circuit board of the first board assembly 331 through the flexible printed circuit board may reduce an influence which the sway, movement, or vibration has on a connection structure between the connector 425 and the flexible printed circuit board or the assembly 400 including the microphone 430 (e.g., a reduction in stress against the external pressure or the external shock).

According to an embodiment, the third adhesive member 463 may be disposed between the second region 451b of the fourth support member 450 and the rear plate 211. The third adhesive member 463 may extend along an edge 2112 of the opening 2111 formed in the rear plate 211, and be formed, for instance, in a loop shape. The third adhesive member 463 462 may serve as a seal member that not only couples the fourth support member 450 and the rear plate 211 but also prevents foreign materials such as water and dust from entering between the rear plate 211 and the fourth support member 450.

According to certain embodiments, the first adhesive member 461, the second adhesive member 462, and/or the third adhesive member 463 may include various polymer adhesive materials such as a double-sided tape.

According to certain embodiments, the third printed circuit board 420 may be coupled with the fourth support member 450 by various methods, and a first fixture may be formed between the third printed circuit board 420 and the fourth support member 450. The first fixture may include the first adhesive member 461, or various other adhesive members based on various coupling methods such as fusion.

According to certain embodiments, the third plate 410 may be coupled with the fourth support member 450 by various methods, and a second fixture may be formed between the third plate 410 and the fourth support member 450. The second fixture may include the second adhesive member 462, or various other adhesive members based on various coupling methods such as fusion.

According to certain embodiments, the fourth support member 450 may be coupled with the rear plate 211 by various methods, and a third fixture may be formed between the fourth support member 450 and the rear plate 211. The third fixture may include the third adhesive member 463, or various other adhesive members based on various coupling methods such as fusion.

According to an embodiment, the fourth support member 450 may include a plurality of openings 403, 404, 405, 406, 407, and 408 disposed in relation to the camera module.

Figure 6:
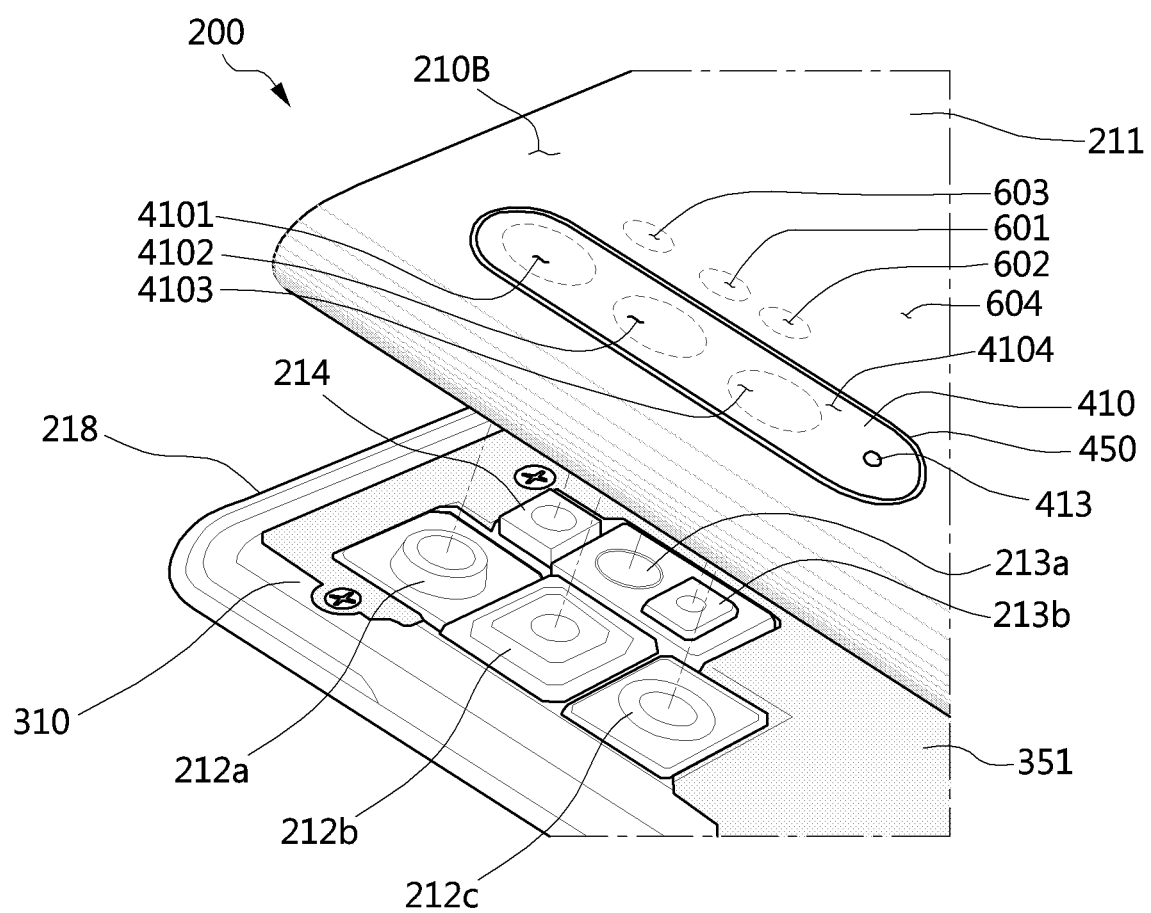
FIG. 6 is a view illustrating a state in which a rear plate is separated from the electronic device of FIG. 2B according to an embodiment of the disclosure in another direction.

FIG. 6 illustrates a state that separates the rear plate 211 from the electronic device 200 of FIG. 2B according to an embodiment of the disclosure. The rear plate 211 includes an opening through which cameras 212a, 212b, and 212c are exposed.

Referring to FIG. 6, in an embodiment, the electronic device 200 may include a lateral member 218, a first support member 310, a second support member 351, a rear plate 211, a third plate 410, second camera modules 212a, 212b, and 212c, third camera modules 213a and 213b, or a flash 214. According to an embodiment, the second camera modules 212a, 212b, and 212c allow photographing of various angles of view. According to an embodiment, the third camera modules 213a and 213b may measure a depth of field.

According to an embodiment, the second camera modules 212a, 212b, and 212c, the third camera modules 213a and 213b, and the flash 214 may be included in the first board assembly 331 of FIG. 3 which is disposed on the first support member 310. The second support member 351 may be coupled to the first support member 310 between the rear plate 211 and the first support member 310, and cover at least a part of the first board assembly 331. According to an embodiment, the second support member 351 may be disposed without overlapping the second camera modules 212a, 212b, and 212c, the third camera modules 213a and 213b, and the flash 214.

According to an embodiment, the third plate 410 may be disposed on the fourth support member 450 coupled with the rear plate 211, and form a part of the rear surface 210B. Referring to FIGS. 4, 5, and 6, the third plate 410 may include a first transparent region 4101, a second transparent region 4102, a third transparent region 4103, or an opaque region 4104.

According to an embodiment, the third plate 410 may include a substantially transparent plate (e.g., a glass plate or a polymer plate), and a layer (e.g., a light shield sheet) that is disposed on one surface of the transparent plate facing the second camera modules 212a, 212b, and 212c and is formed of an opaque material. The opaque region 4104 may be equivalent to a portion at which the layer formed of an opaque material is disposed. The first, second, and third transparent regions 4101, 4102, and 4103 may be equivalent to portions at which the layer formed of an opaque material is not disposed. The layer formed of an opaque material may be enlarged to an edge 4131 of the first through-hole (the microphone hole) 413.

According to certain embodiments, the first transparent region 4101, the second transparent region 4102, the third transparent region 4103, and the opaque region 4104 may be implemented by various other methods. For example, the third plate 410 may include a substantially opaque plate, and transparent members that are disposed in a plurality of openings formed in the opaque plate. The plurality of openings and the transparent members disposed therein may form the first transparent region 4101, the second transparent region 4102, or the third transparent region 4103.

According to an embodiment, the first through-hole 413, the first transparent region 4101, the second transparent region 4102, and the third transparent region 4103 may be arranged in a y-axis direction. The second transparent region 4102 and the third transparent region 4103 may be disposed between the first through-hole 413 and the first transparent region 4101. When viewed from above the rear surface 210B (see FIG. 6) of the electronic device 200, the first transparent region 4101 may at least partly overlap one second camera module 212a. When viewed from above the rear surface 210B of the electronic device 200, the second transparent region 4102 may at least partly overlap another second camera module 212b. When viewed from above the rear surface 210B of the electronic device 200, the third transparent region 4103 may at least partly overlap the remaining second camera module 212c. The opaque region 4104 may shade the inside of the electronic device 200.

Referring to FIGS. 4, 5, and 6, in an embodiment, the fourth support member 450 may include a third opening 403, a fourth opening 404, and a fifth opening 405. When viewed from above the third surface 451 of the fourth support member 450, the third opening 403, the fourth opening 404, and the fifth opening 404 may be disposed inside the protruded ridge 453. The third opening 403 may be disposed between the first transparent region 4101 of the third plate 410 and one second camera module 212a. External light may be incident upon the second camera module 212a through the first transparent region 4101 and the third opening 403. The fourth opening 404 may be disposed between the second transparent region 4102 of the third plate 410 and another second camera module 212b. External light may be incident upon the camera module 212b through the second transparent region 4102 and the fourth opening 404. The fifth opening 405 may be disposed between the third transparent region 4103 of the third plate 410 and the remaining second camera module 212c. External light may be incident upon the second camera module 212c through the third transparent region 4103 and the fifth opening 405. The third plate 410 including the first, second, and third transparent regions 4101, 4102, and 4103 and the opaque region 414 may shade the inside of the electronic device 200 to the utmost while making external light move smoothly to the second camera modules 212a, 212b, 212c. The first, second, and third transparent regions 4101, 4102, and 4103 may be formed, for instance, in a circular shape, but may be formed in various other shapes without being limited thereto. The third, fourth, and fifth openings 403, 404, and 405 may be formed in a circular shape, but may be implemented in various other shapes that enable external light to smoothly move to the second camera modules 212a, 212b, and 212c.

According to certain embodiments, positions or the number of the second camera modules may be diverse without being limited to the embodiment of FIGS. 4, 5, and 6, and thus a shape of the third plate 410, positions or the number of the transparent regions included in the third plate 410, a shape of the fourth support member 450, or positions or the number of the openings formed in the fourth support member 450 may vary.

Referring to FIGS. 4, 5, and 6, in an embodiment, the fourth support member 450 may include a sixth opening 406, a seventh opening 407, and an eighth opening 408. When viewed from above the third surface 451, the sixth opening 406, the seventh opening 407, and the eighth opening 408 may be disposed outside the protruded ridge 453. The rear plate 211 may include a fourth transparent region 601, a fifth transparent region 602, a sixth transparent region 603, and an opaque region 604.

According to an embodiment, the rear plate 211 may include a substantially transparent plate (e.g., a glass plate or a polymer plate), and a layer (e.g., a light shield sheet) that is disposed on one surface of the transparent plate in the face of the third surface 451 of the fourth support member 450 and is formed of an opaque material. The opaque region 604 may be equivalent to a portion at which the layer formed of an opaque material is disposed. The fourth, fifth, and sixth transparent regions 601, 602, and 603 may be equivalent to portions at which the layer formed of an opaque material is not disposed.

According to certain embodiments, the fourth transparent region 601, the fifth transparent region 602, the sixth transparent region 603, and the opaque region 604 may be implemented by various other methods. For example, the rear plate 211 may include a substantially opaque plate, and transparent members that are disposed in a plurality of openings formed in the opaque plate. The plurality of openings and the transparent members disposed therein may form the fourth transparent region 601, the fifth transparent region 602, or the sixth transparent region 603.

According to an embodiment, when viewed from above the rear surface 210B (see FIG. 6) of the electronic device 200, the fourth transparent region 601 may at least partly overlap the sixth opening 406. When viewed from above the rear surface 210B of the electronic device 200, the fifth transparent region 602 may at least partly overlap the seventh opening 407. When viewed from above the rear surface 210B of the electronic device 200, the sixth transparent region 603 may at least partly overlap the eighth opening 408. The sixth opening 406 may be disposed between one third camera module 213a and the fourth transparent region 601. External light may be incident upon the third camera module 213a through the fourth transparent region 601 and the sixth opening 406. The seventh opening 407 may be disposed between the remaining third camera module 213b and the fifth transparent region 602. External light may be incident upon the third camera module 213b through the fifth transparent region 602 and the seventh opening 407. The eighth opening 408 may be disposed between the flash 214 and the sixth transparent region 603. Light output from the flash 214 may go to the outside through the eighth opening 408 and the sixth transparent region 603. The opaque region 604 may shade the inside of the electronic device 200. The rear plate 211 including the fourth, fifth, and sixth transparent regions 601, 602, and 603 and the opaque region 604 may shade the inside of the electronic device 200 while allowing external light to smoothly move to the third camera modules 213a and 213b and allowing light output from the flash 214 to smoothly move to the outside. The fourth, fifth, and sixth transparent regions 601, 602 and 603 may have, for instance, circular shapes, and may be formed in various other shapes without being limited thereto. The sixth and seventh openings 406 and 407 may have, for instance, circular shapes, and may be implemented in various other shapes allowing external light to smoothly move to the third camera modules 213a and 213b without being limited thereto. The eighth opening 408 may have, for instance, a circular shape, and may be implemented in various other shapes allowing light output from the flash 214 to smoothly move to the outside without being limited thereto.

According to an embodiment, the sixth opening 406, the seventh opening 407, and the eighth opening 408 may be arranged in the y-axis direction. According to certain embodiments, positions or the number of the third camera modules or a position or the number of the flash may be diverse without being limited to the embodiment of FIGS. 4, 5, and 6, and thus a shape of the fourth support member 450, positions or the number of the openings formed in the fourth support member 450, and positions or the number of the transparent regions included in the rear plate 211 may vary. According to any embodiment, the third camera modules may be omitted, and thus the fourth support member 450 or the rear plate 211 may vary.

According to certain embodiments, the second camera modules 212a, 212b, and 212c, the third camera modules 213a and 213b, or the flash 214 may be disposed on or coupled to the fourth support member 450.

According to certain embodiments, the fourth support member 450 may be utilized for various other optical devices instead of the second camera modules 212a, 212b, and 212c, the third camera modules 213a and 213b, or the flash 214 of FIG. 6. The assembly 400 of FIG. 5 which includes the microphone 430 may be implemented in correlation with various sensors (e.g., various biometric sensors such as a fingerprint sensor or a heart rate sensor, or various other optical sensors) that utilize the rear surface of the electronic device 200.

Figure 7:
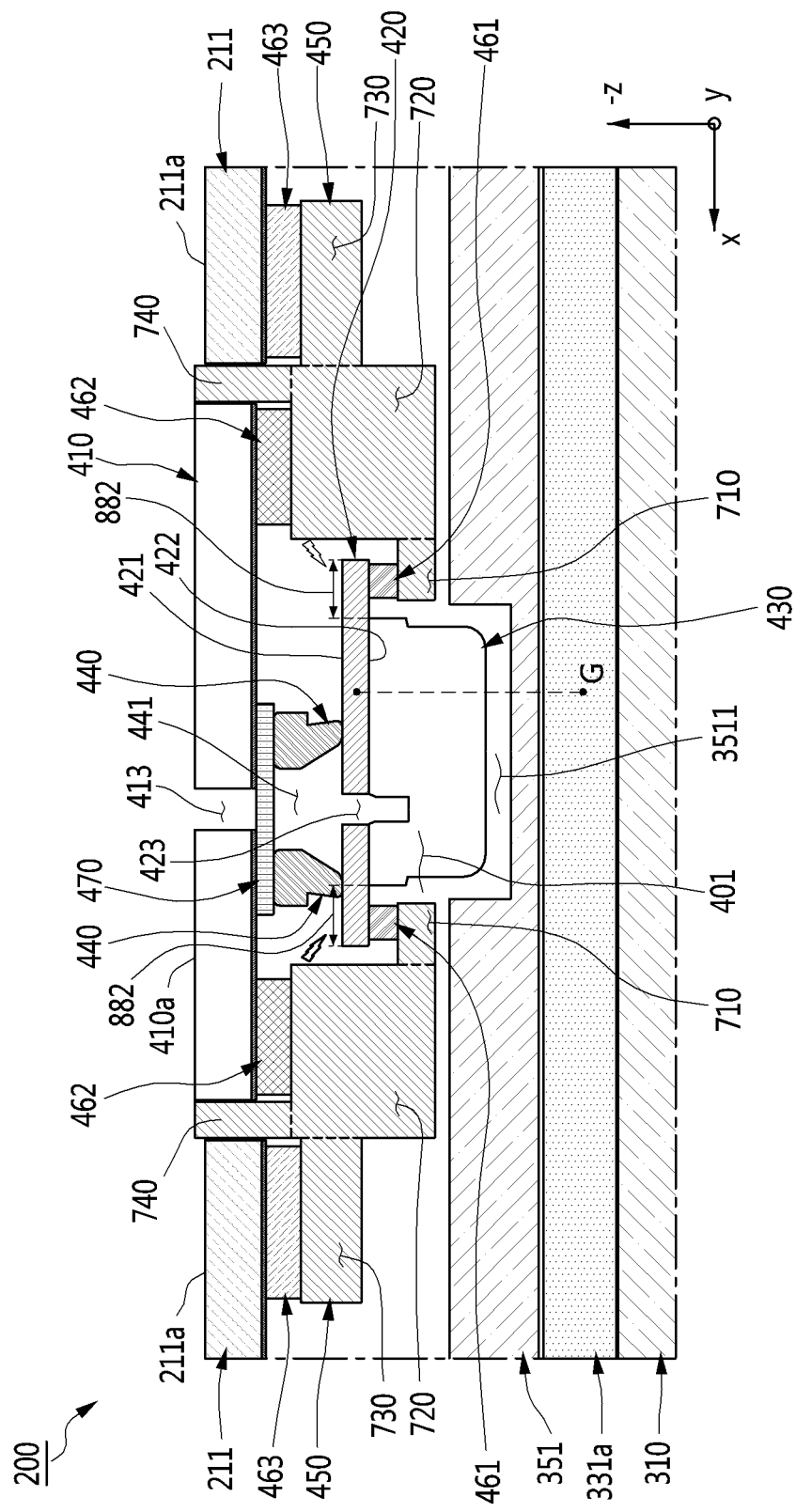
FIG. 7 is a sectional view taken along line A-A' in the electronic device of FIG. 2B according to an embodiment of the disclosure in another direction.

FIG. 7 is a sectional view taken along A-A' in the electronic device 200 of FIG. 2B according to an embodiment of the disclosure.

The microphone 430 can be easily placed in the electronic device 200, and performance of the microphone can be secured by simplifying a passage along which external sounds move to the microphone, thereby reducing a loss of the sounds, and avoiding deterioration of acoustic characteristics. The through hole 413 through the plate 410 and the through-hole 423 in the PCB 420 at least partially align so that at least a portion of the through-hole 413 and through-hole 423 overlap. Accordingly, through hole 413, interior of sealing member 440, and through-hole 423 guide soundwaves to the microphone 430. Moreover, sound permeable member 470 prevents introduction of foreign substances, such as water, into the electronic device 200.

Referring to FIG. 7, in an embodiment, the electronic device 200 may include a first support member 310, a first printed circuit board 331a (e.g., a first printed circuit board included in the first board assembly 331 of FIG. 3), a second support member 351, a rear plate 211, a third plate 410, a third printed circuit board 420, a microphone 430, a seal member 440, a sound permeable member 470, a fourth support member 450, a first adhesive member 461, a second adhesive member 462, or a third adhesive member 463.

The third plate 410 may form a part 410a of the rear surface 210B (see FIG. 2B). The third plate 410 may include a first through-hole 413 utilized as a microphone hole.

The third printed circuit board 420 may include a first surface 421 that faces the third plate 410, and a second surface 422 that faces away or is directed in a direction opposite to the first surface 421 and the plate 410. The third printed circuit board 420 may include a second through-hole 423 that passes through the first surface 421 and the second surface 422. When viewed from above the third plate 410, the first through-hole 413 of the third plate 410 may at least partly overlap the second through-hole 423 of the third printed circuit board 420.

The microphone 430 may be disposed on the surface of the third printed circuit board 420 that faces away from the plate 410. When viewed from above the first surface 421, the second through-hole 423 may at least partly overlap the microphone 430.

According to an embodiment, the seal member 440 may be elastically disposed between the third plate 410 and the third printed circuit board 420 around the first through-hole 413 and/or the second through-hole 423. External sounds may pass the first through-hole 413 of the third plate 410, a passage 441 of the seal member 440, and the second through-hole 423 of the third printed circuit board 420, and be introduced into the microphone 430.

According to an embodiment, the sound permeable member 470 may be disposed between the third plate 410 and the seal member 440. The sound permeable member 470 may be disposed between the first through-hole 413 of the third plate 410 and the passage 441 of the seal member 440, and external sounds may substantially pass the sound permeable member 470, and move to the passage 441. The sound permeable member 470 may prevent foreign materials such as water and dust from being introduced into the electronic device 200 through the first through-hole 413. The sound permeable member 470 may be implemented by various waterproof materials (e.g., Expanded PTFE). According to an embodiment, the fourth support member 450 may include a first portion 710 that faces the second surface 422 of the third printed circuit board 420. The sound permeable member 470, the seal member 440, and the third printed circuit board 420 may be disposed in a space between the third plate 410 and the first portion 710 of the fourth support member 450. The first portion 710 may include the first opening 401 (see FIG. 4 or 5) into which the microphone 430 is inserted. According to certain embodiments, the second support member 351 may include a recess 3511 for housing a part of the microphone 430 inserted into the first opening 401.

The recess 3511 of the second support member 351 may make the electronic device 200 more slim. The first adhesive member 461 may be disposed between the first portion 710 and the second surface 422 of the third printed circuit board 420, and thus the third printed circuit board 420 may be coupled with the fourth support member 450. The first adhesive member 461 may also serve as a seal member that prevents foreign materials such as water from moving between the second surface 422 of the third printed circuit board 420 and the fourth support member 450. The first adhesive member 461 may prevent noises from being introduced into the microphone 430 between the fourth support member 450 and the third printed circuit board 420. For example, the noises may occur at various components, such as a motor, a camera, or a speaker, which are disposed inside the electronic device 200.

According to an embodiment, the fourth support member 450 may include a second portion 720 that extends from the first portion 710 and faces the third plate 410. The second adhesive member 462 may be disposed between the second portion 720 and the third plate 410, and thus the third plate 410 may be coupled with the fourth support member 450. The second adhesive member 462 may also serve as a seal member that prevents foreign materials such as water from moving between the third plate 410 and the fourth support member 450.

According to an embodiment, the fourth support member 450 may include a third portion 730 that extends from the second portion 720 and faces the rear plate 211. The third adhesive member 463 may be disposed between the third portion 730 and the rear plate 211, and thus the fourth support member 450 may be coupled with the rear plate 211. The third adhesive member 463 may also serve as a seal member that prevents foreign materials such as water from moving between the rear plate 211 and the fourth support member 450.

According to an embodiment, the fourth support member 450 may include a fourth portion 740 that extends from the second portion 720 and is disposed in the opening 2111 (see FIG. 4) of the rear plate 211. The third plate 410 may be disposed in a recess-shaped space (e.g., a space 455 of FIG. 5) defined by the second portion 720 and the fourth portion 740. The fourth portion 740 may be the protruded ridge 453 of FIG. 5 which extends between the rear plate 211 and the third plate 410. The fourth portion 740 of the fourth support member 450 may form a part of the rear surface 210B (e.g., see FIG. 2B).

According to certain embodiments, the third plate 410 and the rear plate 211 may be integrally formed. In this case, the fourth portion 740 of the fourth support member 450 may be omitted. In certain embodiments, the third adhesive member 463 may be omitted, or the second adhesive member 462 may be further expanded.

According to an embodiment, an assembling method of the assembly 400 (see FIG. 4 or 5) including the microphone 430 may include a first process of disposing the third printed circuit board 420 to which the microphone 430 is coupled on the fourth support member 450 through the first adhesive member 461, and a second process of disposing the third plate 410 to which the sound permeable member 470 and the seal member 440 are coupled on the fourth support member 450 through the second adhesive member 462. The assembly 400 may be implemented to simplify a sound movement path between the first through-hole (or the microphone hole) 413 and the microphone 430, or to reduce a length of the movement path, and thus a structural characteristic can reduce assembly deviation or dimensional deviation to contribute to a stable assembly structure while facilitating the assembling method. The stable assembly structure which the assembly 400 has may not only reduce stress of the elements included in the assembly 400 to improve durability but also contribute to securing performance of the microphone 430.

Figure 8:
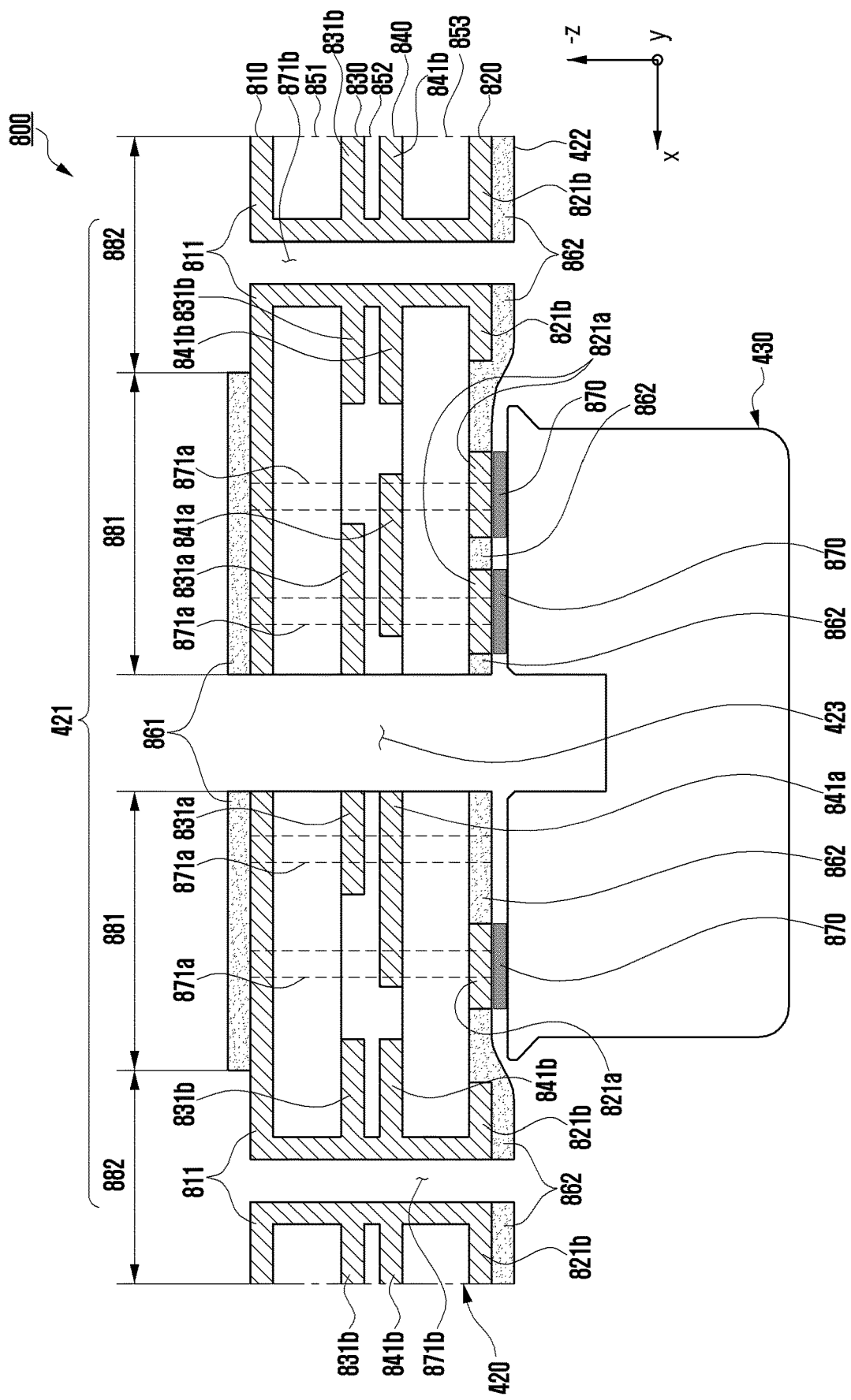
FIG. 8 is a sectional view illustrating an assembly including a third printed circuit board of FIG. 7 and a microphone disposed on the third printed circuit board according to an embodiment of the disclosure in another direction.

FIG. 8 is a sectional view illustrating an assembly 800 that includes the third printed circuit board 420 of FIG. 7 and the microphone 430 disposed thereon according to an embodiment of the disclosure.

Static electricity discharged from external objects proximate to the microphone 430 can potentially deteriorate the microphone 430. Accordingly, in certain embodiments, the first surface 421 of the third printed circuit board 420, the surface that faces the third plate 410, includes a conductive exposure region 882. The conductive region 882 can be electrically connected to the ground G of the first printed circuit board 331a. As a result, static electricity received by the conductive region 882 flows the ground G, thereby preventing deterioration of the microphone 430.

Referring to FIG. 8, in an embodiment, the third printed circuit board 420 may be a multi-layered printed circuit board. The third printed circuit board 420 may include a plurality of conductive layers 810, 820, 830, and 840 that are disposed between the first surface 421 and the second surface 422, and insulative and adhesive materials (e.g., various prepregs 851, 852, and 853 such as an epoxy) that are disposed between the plurality of conductive layers 810, 820, 830, and 840. For example, the third printed circuit board 420 may comprise copper clad laminate (CCL). The CCL is a laminate used in a printed circuit, and may include a structure that attaches one surface or both surfaces of an insulating layer (or an insulating sheet) made up of several insulating material base (e.g., a resin) and a binder.

The plurality of conductive layers 810, 820, 830, and 840 may include, for instance, a first conductive outer layer 810, a second conductive outer layer 820, and conductive inner layers 830 and 840 disposed between the first and second conductive outer layers 810 and 820. The plurality of conductive layers 810, 820, 830, and 840 may include conductive patterns 811, 821a, 821b, 831a, 831b, 841a, and 841b based on a designed layer-specific laminated structure. According to certain embodiments, the number of conductive layers included in the third printed circuit board 420 may be limited to the embodiment of FIG. 8. According to any embodiment, the third printed circuit board 420 may be implemented by a single-sided printed circuit board in which a circuit is formed on one surface alone, or a double-sided printed circuit board in which a circuit is formed on both surfaces.

According to an embodiment, the third printed circuit board 420 may include a first non-conductive material 861 that at least partly applies the first conductive outer layer 810. The third printed circuit board 420 may include a second non-conductive material 862 that at least partly applies the second conductive outer layer 820. The first non-conductive material 861 and/or the second non-conductive material 862 may be various insulating materials such as ink composed of an epoxy. According to an embodiment, the first non-conductive material 861 and the second non-conductive material 862 may be applied by various printing methods relating to a solder mask. A portion of the first conductive outer layer 810 which is covered by the first non-conductive material 861 and a portion of the second conductive outer layer 820 which is covered by the second non-conductive material 862 are not exposed, and thus oxidation thereof can be prevented. The first non-conductive material 861 and the second non-conductive material 862 may serve to prevent generation of a bridge of a solder when components are mounted.

According to an embodiment, the partly conductive patterns 821a of the second conductive outer layer 820 which are not covered by the second non-conductive material 862 may be utilized as first terminals (e.g., lands) for disposing the microphone 430 on the second surface 422. The microphone 430 may be disposed on the first terminals of the second surface 422 using a conductive binding material 870 such as a solder. According to an embodiment, the partly conductive patterns (not illustrated) of the second conductive outer layer 820 which are not covered by the second non-conductive material 862 may be utilized as second terminals for disposing the connector 425 of FIG. 4 on the second surface 422. The connector 425 may be disposed on the second terminals of the second surface 422 using the conductive binding material such as a solder. According to certain embodiments, the connector 425 of FIG. 4 may be omitted, and in this case, a flexible conductive member may be disposed between the second terminals and the first printed circuit board 331a of FIG. 7. The third printed circuit board 420 may include a plurality of through-holes (hereinafter referred to as "vias') 871a and 871b that are plated with a conductive material. The first and second terminals of the second surface 422 may be electrically connected through the vias 871a and conductive patterns 831a and 841b of the conductive inner layers 830 and 840 that are electrically connected due to the vias 871a.

According to an embodiment, at least a part of the conductive pattern 811 included in the first conductive outer layer 810 may be utilized as a first ground plane. The partly conductive pattern 821b included in the second conductive outer layer 820 may be utilized as a second ground plane. The partly conductive pattern 831b included in the third conductive inner layer 830 may be utilized as a third ground plane. The partly conductive pattern 841b included in the fourth conductive inner layer 840 may be utilized as a fourth ground plane. The first, second, third, and fourth ground planes may be electrically connected through the vias 871b. According to an embodiment, the first, second, third, and fourth ground planes may be electrically connected to a ground (or a ground plane) G included in the first printed circuit board 331a of FIG. 7 through the connector 425 of FIG. 4.

According to an embodiment, a non-conductive exposure region 881 formed of the first non-conductive material 861 may be formed on the first surface 421 of the third printed circuit board 420. A part 882 of the conductive pattern 811 of the first conductive outer layer 810 that is not covered by the first non-conductive material 861 may be exposed to the first surface 421 of the third printed circuit board 420. The conductive exposure region 882 may be electrically connected to the ground G included in the first printed circuit board 331a of FIG. 7.

Figure 9:
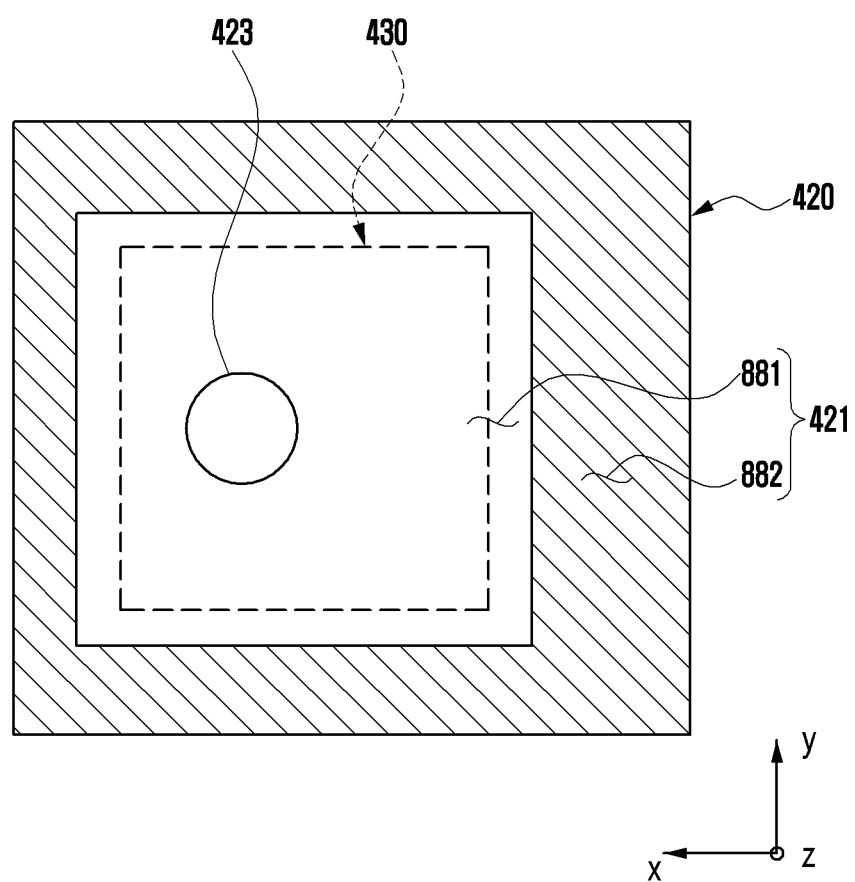
FIG. 9 is a top view illustrating the assembly of FIG. 8 according to an embodiment of the disclosure in another direction.

According to an embodiment, static electricity introduced into the electronic device 200 due to electro-static discharge (ESD) may cause a malfunction or electrical breakdown of the microphone 430. For example, the static electricity may be discharged from various external objects. Referring to FIGS. 7, 8, and 9, in an embodiment, the static electricity discharged from the external objects may flow to the ground G of the first printed circuit board 331a through the conductive exposure region 882 that forms at least a part of the first surface 421 of the third printed circuit board 420. The static electricity may be absorbed by the ground G of the first printed circuit board 331a, and thus the malfunction or electrical breakdown of the microphone 430 may be prevented.

According to an embodiment, the fourth support member 450 may be formed of a metal, and the static electricity discharged from the external objects may flow into the fourth support member 450. The static electricity flowing into the fourth support member 450 may be induced to the conductive exposure region 882 of the third printed circuit board 420. According to an embodiment, the conductive exposure region 882 may be located within a distance (e.g., about 1 mm) set with the second portion 720 of the fourth support member 450 such that the static electricity can be induced from the fourth support member 450. According to an embodiment, the second portion 720 of the fourth support member 450 may be disposed within a distance set with the conductive exposure region 882 of the third printed circuit board 420 due to structural features which the assembly 400 (see FIG. 4 or 5) provided to simplify a passage along which external sounds move to the microphone 430 has. For this reason, a structure in which the static electricity is induced from the fourth support member 450 to the conductive exposure region 882 of the third printed circuit board 420 can be easily implemented in the assembly 400 according to an embodiment.

FIG. 9 is a top view illustrating the assembly 800 of FIG. 8 according to an embodiment of the disclosure.

A conductive region 882 surrounds a conductive region 881. The conductive region 882 may physically and/or electrically connected to the fourth support member 450, thereby causing static electrically flowing into the fourth support member 450 to the conductive region 882. Since the conductive region 882 is electrically connected to the ground G of the first printed circuit board 331a, static electricity flows to the ground.

Referring to FIGS. 8 and 9, in an embodiment, when viewed from above the first surface 421 of the third printed circuit board 420, the non-conductive exposure region 881 formed on the first surface 421 may at least partly overlap the microphone 430. When viewed from above the first surface 421, the conductive exposure region 882 may be disposed to at least partly surround the non-conductive exposure region 881 such that the conductive exposure region 882 is within a distance set from the second portion 720 (see FIG. 7) of the fourth support member 450. According to an embodiment, when viewed from above the first surface 421, the conductive exposure region 882 may be disposed along the second portion 720 (see FIG. 7) of the fourth support member 450 in a loop shape.

According to an embodiment, when viewed from above the first surface 421, the conductive exposure region 882 may be disposed not to overlap the microphone 430. According to certain embodiments (not illustrated), when viewed from above the first surface 421, the conductive exposure region 882 may be expanded to at least partly overlap the microphone 430. According to certain embodiments (not illustrated), when viewed from above the first surface 421, the conductive exposure region 882 may not be expanded inside the seal member 440 of FIG. 7.

Referring to FIG. 7, in certain embodiments, when viewed from above the first surface 421, the second portion 720 of the fourth support member 450 may also be expanded to at least partly cover the conductive exposure region 882 between the third printed circuit board 420 and the third plate 410.

According to certain embodiments, the conductive exposure region 882 may be physically in contact with the fourth support member 450, or be electrically connected to the fourth support member 450 through a separate electrical path. For this reason, the static electricity flowing into the fourth support member 450 may smoothly flow to the conductive exposure region 882 that is electrically connected to the ground G of the first printed circuit board 331a. According to any embodiment, in the case where the electronic device 200 is electrically connected to an external device (e.g., a power supply), a leakage current can flow to the fourth support member 450 formed of a metal and the conductive exposure region 882 that is electrically connected to the fourth support member 450, and thus the conductive exposure region 882 may be preferably disposed in physical separation from the fourth support member 450. According to certain embodiments, various elements capable of absorbing the static electricity such as a varistor (variable resistor, such as a multi-layer varistor) that is electrically connected to the conductive exposure region 882 may be disposed on the third printed circuit board 420. For example, the static electricity may move to the varistor through the conductive exposure region 882, and be absorbed at the varistor.

According to certain embodiments, the conductive exposure region 882 of the third printed circuit board 420 may be electrically connected to the fourth support member 450 through at least one varistor. In the case where the electronic device 200 is electrically connected to an external electronic device (e.g., a power supply), a leakage current can be prevented from flowing to the fourth support member 450 formed of a metal, and/or the conductive exposure region 882 that is electrically connected to the fourth support member 450. For this reason, an electric shock can be prevented.

According to certain embodiments, the fourth support member 450 may be electrically connected to the ground G of the first printed circuit board 331*a* through various electrical paths (e.g., a flexible conductive member). In this case, the conductive exposure region 882 may be omitted.

According to an embodiment of the disclosure, an electronic device (e.g., an electronic device 200 of FIG. 7) may include a plate (e.g., a third plate 410 of FIG. 7) at least partially forming one surface of a housing (e.g., a housing 210 of FIG. 2A) and including a first through-hole (e.g., a first through-hole 413 of FIG. 7). The electronic device may include a printed circuit board (e.g., a third printed circuit board 420 of FIG. 7) that is disposed in the housing under the plate (e.g., the third plate 410 of FIG. 7). The printed circuit board include a second through-hole (e.g., a second through-hole 423 of FIG. 7) that at least partially overlaps the first through-hole when viewed from above the plate. The electronic device may include a microphone (e.g., a microphone 430 of FIG. 7) that is disposed on a surface (e.g., surface 422) of the printed circuit board facing away from the plate, and at least overlapping the second through-hole when viewed from above the first surface. The electronic device may include a seal member (e.g., a seal member 440 of FIG. 7) that is disposed between the plate and the printed circuit board around the first through-hole or the second through-hole. The electronic device may include a support member (e.g., a fourth support member 450 of FIG. 7) that includes a first portion (e.g., a first portion 710 of FIG. 7) that faces the printed circuit board and includes an opening (e.g., a first opening 401 of FIG. 4 or 5) penetrated by the microphone, and a second portion (e.g., a second portion 720 of FIG. 7) that extends from the first portion and faces the plate. The electronic device may include a first fixture that is disposed between the second surface and the first portion. The electronic device may include a second fixture that is disposed between the plate and the second portion.

According to an embodiment of the disclosure, the electronic device may further include a sound permeable member (e.g., a sound permeable member 470 of FIG. 7) that is disposed between the seal member (e.g., the seal member 440 of FIG. 7) and the first through-hole (e.g., the first through-hole 413 of FIG. 7) and includes a waterproof material.

According to an embodiment of the disclosure, the waterproof material may comprises Expanded PTFE.

According to an embodiment of the disclosure, the first fixture may include an adhesive member (e.g., a first adhesive member 461 of FIG. 7). The second fixture may include an adhesive member (e.g., a second adhesive member 462 of FIG. 7).

According to an embodiment of the disclosure, the support member (e.g., the fourth support member 450 of FIG. 7) may comprise metal. The printed circuit board (e.g., the third printed circuit board 420 of FIG. 7) may include a conductive exposure region (e.g., a conductive exposure region 882 of FIG. 8) that forms at least a part of the surface (e.g., the first surface 421 of FIG. 7) facing the plate and is electrically connected to a ground (e.g., a ground G of FIG. 7) of the electronic device.

According to an embodiment of the disclosure, the conductive exposure region (e.g., the conductive exposure region 882 of FIG. 8) may be disposed apart from the second portion (e.g., the second portion 720 of FIG. 7) when viewed from above the plate (e.g., the third plate 410 of FIG. 7).

According to an embodiment of the disclosure, the conductive exposure region (e.g., the conductive exposure region 882 of FIG. 7) may be disposed along the second portion (e.g., the second portion 720) in a loop shape when viewed from above the first surface (e.g., the first surface 421 of FIG. 7).

According to an embodiment of the disclosure, the conductive exposure region (e.g., the conductive exposure region 882 of FIG. 7) may be electrically connected to the support member (e.g., the fourth support member 450 of FIG. 7).

According to an embodiment of the disclosure, the electronic device may further include an optical device (e.g., a second camera module 212*a*, 212*b*, or 212*c* of FIG. 6) that is disposed in the housing and at least partly overlaps the plate at a position different from the first through-hole (e.g., the first through-hole 413 of FIG. 4) when viewed from above the plate (e.g., the third plate 410 of FIG. 4). The support member (e.g., the fourth support member 450 of FIG. 4) may further include a second opening (e.g., a third opening 403, a fourth opening 404, or a fifth opening 405 of FIG. 4) that is disposed between the optical device and the plate.

According to an embodiment of the disclosure, the plate (e.g., the third plate 410 of FIG. 4) may include a transparent region (e.g., a first transparent region 4101, a second transparent region 4102, or a third transparent region 4103 of FIG. 4) that at least partly overlaps the second opening (e.g., the third opening 403, the fourth opening 404, or the fifth opening 405 of FIG. 4), and an opaque region (e.g., an opaque region 4104 of FIG. 4) that surrounds the transparent region. The first through-hole (e.g., the first through-hole 413 of FIG. 4) may be formed in the opaque region.

According to an embodiment of the disclosure, the housing (e.g., the housing 210 of FIG. 2A) may further include a first plate (e.g., a first plate 202 of FIG. 3) that forms a front surface of the electronic device, a second plate (e.g., a second plate 211 of FIG. 3) that forms a rear surface of the electronic device, and a lateral member (e.g., a lateral member 218 of FIG. 3) that surrounds a space between the first plate and the second plate. The electronic device may further include a display (e.g., a display 202 of FIG. 3) which is disposed in the space and at least a part of which is seen through the first plate. The plate (e.g., the third plate 410 of FIG. 4) including the first through-hole (e.g., the first through-hole 413 of FIG. 4) may be exposed through an opening (e.g., an opening 2111 of FIG. 4) formed in the second plate, and form a part of the rear surface.

According to an embodiment of the disclosure, the support member (e.g., the fourth support member 450 of FIG. 7) may further include a third portion (e.g., a third portion 730 of FIG. 7) that extends from the second portion (e.g., the second portion 720 of FIG. 7) and is coupled with the second plate (e.g., the rear plate 211 of FIG. 4) by an adhesive member (e.g., a third adhesive member 463 of FIG. 7).

According to an embodiment of the disclosure, the support member (e.g., the fourth support member 450 of FIG. 7) may further include a looped fourth portion (e.g., a fourth portion 740 of FIG. 7) that extends from the second portion (e.g., the second portion 720 of FIG. 7) between the plate (e.g., the third plate 410 of FIG. 7), which includes the first through-hole (e.g., the first through-hole 413 of FIG. 7), and the second plate (e.g., the rear plate 211 of FIG. 7).

According to an embodiment of the disclosure, the support member (e.g., the fourth support member 450 of FIG. 7) may further include a second opening (e.g., a sixth opening 406, a seventh opening 407, or an eighth opening 408 of FIG. 4) formed in a portion that partly overlaps the second plate (e.g., the rear plate 211 of FIG. 7) outside the fourth portion (e.g., the fourth portion 740 of FIG. 7) when viewed from above the rear surface. The electronic device may further include an optical device (e.g., a third camera module 213a or 213b, or a flash 214 of FIG. 6) that is disposed in the space and at least partly overlaps the second opening when viewed from above the rear surface. The second plate may include a transparent region (e.g., a fourth transparent region 601, a fifth transparent region 602, or a sixth transparent region 603 of FIG. 4) that at least partly overlaps the second opening.

According to certain embodiments of the disclosure, an electronic device (e.g., an electronic device 200 of FIG. 2A) may include a housing that includes a first plate (e.g., a front plate 202 of FIG. 3), a second plate (e.g., a rear plate 211 of FIG. 3) that is disposed on a side opposite to the first plate and includes an opening (e.g., an opening 2111 of FIG. 3), and a lateral member (e.g., a lateral member 218 of FIG. 3) that at least partly surrounds a space between the first plate and the second plate. The electronic device may include a display (e.g., a display 201 of FIG. 3) which is disposed in the space and at least a part of which is seen through the first plate. The electronic device may include a third plate (e.g., a third plate 410 of FIG. 4) that is exposed through the opening and includes a first through-hole (e.g., a first through-hole 413 of FIG. 4). The electronic device may include a printed circuit board (e.g., a third printed circuit board 420 of FIG. 7) that is disposed in the space. The printed circuit board may include a first surface (e.g., a first surface 421 of FIG. 7) that faces the third plate, and a second surface (e.g., a second surface 422 of FIG. 7) that is directed in a direction opposite to the first surface. The printed circuit board may include a second through-hole (e.g., a second through-hole 423 of FIG. 7) that passes through the first surface and the second surface and at least partly overlaps the first through-hole when viewed from above the first surface. The electronic device may include a microphone (e.g., a microphone 430 of FIG. 7) that is disposed on the second surface and at least partly overlaps the second through-hole when viewed from above the first surface. The electronic device may include a seal member (e.g., a seal member 440 of FIG. 7) that is disposed between the third plate and the first surface around the first through-hole and/or the second through-hole. The electronic device may include a support member (e.g., a fourth support member 450 of FIG. 7) that includes a first portion (e.g., a first portion 710 of FIG. 7), which faces the second surface and includes an opening penetrated by the microphone, and a second portion (e.g., a second portion 720 of FIG. 7) that extends from the first portion and faces the third plate. The electronic device may include a first fixture that is disposed between the second surface and the first portion. The electronic device may include a second fixture that is disposed between the third plate and the second portion.

According to certain embodiments of the disclosure, the electronic device may further include a sound permeable member (e.g., a sound permeable member 440 of FIG. 7) that is disposed between the seal member (e.g., the seal member 440 of FIG. 7) and the first through-hole (e.g., the first through-hole 413 of FIG. 7) and includes a waterproof material.

According to certain embodiments of the disclosure, the support member (e.g., the fourth support member 450 of FIG. 7) may be formed of a metal. The printed circuit board (e.g., the third printed circuit board 420 of FIG. 7) may include a conductive exposure region (e.g., a conductive exposure region 882 of FIG. 7) that forms at least a part of the first surface (e.g., the first surface 421 of FIG. 7) and is electrically connected to a ground (e.g., a ground G of FIG. 7) of the electronic device. The conductive exposure region may be disposed around the second portion (e.g., the second portion 720 of FIG. 7) when viewed from above the first surface.

According to certain embodiments of the disclosure, the support member (e.g., the fourth support member 450 of FIG. 7) may be formed of a metal and may be electrically connected to a ground (e.g., a ground G of FIG. 7) of the electronic device.

According to certain embodiments of the disclosure, the support member (e.g., the fourth support member 450 of FIG. 7) may further include a third portion (e.g., a third portion 730 of FIG. 7) that extends from the second portion (e.g., the second portion 720 of FIG. 7) and is coupled with the second plate (e.g., the rear plate 211 of FIG. 4) by an adhesive member (e.g., a third adhesive member 463 of FIG. 7). The support member may further include a looped fourth portion (e.g., a fourth portion 740 of FIG. 7) that extends from the second portion between the second plate and the third plate (e.g., the third plate 410 of FIG. 7).

According to certain embodiments of the disclosure, the electronic device may further include an optical device (e.g., a second camera module 212a, 212b, or 212c of FIG. 6) that is disposed in the space and at least partly overlaps the third plate (e.g., the third plate 410 of FIG. 4) at a position different from the first through-hole (e.g., the first through-hole 413 of FIG. 4) inside the fourth portion (e.g., the fourth portion 740 of FIG. 7) when viewed from above the second plate (e.g., the rear plate 211 of FIG. 7). The support member (e.g., the fourth support member 450 of FIG. 4) may further include a second opening (e.g., a third opening 403, a fourth opening 404, or a fifth opening 405 of FIG. 4) that is disposed between the optical device and the third plate. The third plate may include a transparent region (e.g., a first transparent region 4101, a second transparent region 4102, or a third transparent region 4103 of FIG. 4) that at least partly overlaps the second opening, and an opaque region (e.g., an opaque region 4104 of FIG. 4) that surrounds the transparent region. The first through-hole may be formed in the opaque region.

According to certain embodiments of the disclosure, the electronic device may further include a second printed circuit board (e.g., a first printed circuit board 331a of FIG. 7) that is disposed between the support member (e.g., the fourth support member 450 of FIG. 7) and the first plate (e.g., the front plate 202 of FIG. 3). The microphone (e.g., the microphone 430 of FIG. 7) may be electrically connected to the second printed circuit board through a flexible conductive member disposed between the second surface (e.g., the second surface 421 of FIG. 7) and the second printed circuit board.

The embodiments of the disclosure disclosed herein and the drawings merely present specific examples to easily describe technical contents according to the embodiments of the disclosure and to help easy understanding of the embodiments of the disclosure, and are not intended to limit the scope of the embodiments of the disclosure. Thus, it should be interpreted that the scope of the certain embodiments of the disclosure covers all alterations or modifications derived on the basis of the technical idea of the certain embodiments of the disclosure, in addition to the embodiments disclosed herein

What is claimed is:

1. An electronic device comprising:
a plate at least partially forming one surface of a housing and including a first through-hole;
a printed circuit board disposed in the housing under the plate, the printed circuit board having a second through-hole at least partly overlapping the first through-hole when viewed from above the plate;
a microphone disposed on a surface of the printed circuit board facing away from the plate, and at least partly overlapping the second through-hole when viewed from above the plate;
a seal member that is disposed between the plate and the printed circuit board around the first through-hole or the second through-hole;
a support member that includes a first portion that faces the printed circuit board and includes an opening, the opening penetrated by the microphone, a second portion that extends from the first portion in a first direction and faces the plate, the second portion having a thickness in a second direction perpendicular to the first direction greater than a thickness of the first portion, a third portion that extends from the second portion in the first direction, and a looped fourth portion that extends from the second portion in the second direction to be disposed between the plate and the housing;
a first fixture that is disposed between the printed circuit board and the first portion;
a second fixture that is disposed between the plate and the second portion; and
a third fixture that is disposed between the housing and the third portion.

2. The electronic device of claim 1, further comprising a sound permeable member disposed between the seal member and the first through-hole, wherein the permeable member includes a waterproof material.

3. The electronic device of claim 2, wherein the waterproof material comprises Expanded PTFE.

4. The electronic device of claim 1, wherein the first fixture or the second fixture include an adhesive member.

5. The electronic device of claim 1, wherein:
the support member comprises metal; and
the printed circuit board includes a conductive exposure region on the surface facing the plate, wherein the conductive exposure region is electrically connected to a ground of the electronic device.

6. The electronic device of claim 5, wherein the conductive exposure region is separated from the second portion when viewed from above the plate.

7. The electronic device of claim 5, wherein the conductive exposure region is electrically connected to the support member.

8. The electronic device of claim 1, further comprising an optical device that is disposed in the housing and at least partly overlaps the plate at a position different from the first through-hole when viewed from above the plate,
wherein the support member further includes a second opening that is disposed between the optical device and the plate.

9. The electronic device of claim 8, wherein:
the plate includes a transparent region that at least partly overlaps the second opening, and an opaque region that surrounds the transparent region; and
the first through-hole is formed in the opaque region.

10. The electronic device of claim 1, wherein:
the housing further includes a first plate that forms a front surface of the electronic device, a second plate that forms a rear surface of the electronic device, and a lateral member that surrounds a space between the first plate and the second plate;
the electronic device further includes a display which is disposed in the space and at least a part of which is seen through the first plate; and
the plate including the first through-hole is exposed through an opening formed in the second plate, and forms a part of the rear surface.

11. The electronic device of claim 1, wherein:
the support member further includes a second opening formed in a portion partially overlapping the second plate outside the fourth portion when viewed from above the rear surface;
the electronic device further comprises an optical device disposed in the space and at least partly overlapping the second opening when viewed from above the rear surface; and
the second plate includes a transparent region at least partially overlapping the second opening.

12. An electronic device comprising:
a housing that includes a first plate, a second plate disposed on a side opposite to the first plate including an opening, and a lateral member at least partially surrounding a space between the first plate and the second plate;
a display disposed in the space, wherein at least a part of the display is visible through the first plate;
a third plate exposed through the opening and including a first through-hole;
a printed circuit board disposed in the space and including a second through-hole at least partly overlapping the first through-hole when viewed from above the third plate;
a microphone on a surface of the printed circuit board facing away from the third plate, wherein the microphone at least partly overlaps the second through-hole when viewed from above the third plate;
a seal member that is disposed between the third plate and the printed circuit board around the first through-hole or the second through-hole;
a support member including a first portion, which faces the surface and includes an opening penetrated by the microphone, a second portion that extends from the first portion in a first direction and faces the third plate, the second portion having a thickness in a second direction perpendicular to the first direction greater than a thickness of the first portion, a third portion that extends from the second portion in the first direction, and a looped fourth portion that extends from the second portion in the second direction to be disposed between the second plate and the third plate;

a first fixture that is disposed between the surface and the first portion;

a second fixture that is disposed between the third plate and the second portion; and a third fixture that is disposed between the second plate and the third portion.

13. The electronic device of claim 12, further comprising a sound permeable member disposed between the seal member and the first through-hole and comprising waterproof material.

14. The electronic device of claim 12, wherein:

the support member comprises metal;

the printed circuit board includes a conductive exposure region forming at least a part of a surface facing the third plate, wherein the conductive exposure region is electrically connected to a ground of the electronic device; and the conductive exposure region is disposed around the second portion when viewed from above the surface facing the third plate.

15. The electronic device of claim 12, wherein the support member comprises a metal and is electrically connected to a ground of the electronic device.

16. The electronic device of claim 12, further comprising an optical device disposed in the space at least partially overlapping the third plate at a position different from the first through-hole inside the fourth portion when viewed from above the second plate wherein the support member further includes a second opening that is disposed between the optical device and the third plate, the third plate includes a transparent region that at least partly overlaps the second opening, and an opaque region that surrounds the transparent region, and the first through-hole is formed in the opaque region.

17. The electronic device of claim 12, further comprising a second printed circuit board that is disposed between the support member and the first plate, wherein the microphone is electrically connected to the second printed circuit board through a flexible conductive member disposed between the surface facing away from the third plate and the second printed circuit board.

* * * * *